(12) United States Patent
Alawieh et al.

(10) Patent No.: US 12,457,143 B2
(45) Date of Patent: Oct. 28, 2025

(54) APPARATUS AND METHOD FOR A WIRELESS COMMUNICATION SYSTEM EMPLOYING CYCLIC SHIFT HOPPING

(71) Applicant: Fraunhofer-Gesellschaft zur Foerderung der angewandten Forschung e.V., Munich (DE)

(72) Inventors: Mohammad Alawieh, Erlangen (DE);
Ernst Eberlein, Grossenseebach (DE);
Marcus Grossmann, Erlangen (DE);
Birendra Ghimire, Erlangen (DE);
Andreas Eidloth, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 156 days.

(21) Appl. No.: 18/164,490

(22) Filed: Feb. 3, 2023

(65) Prior Publication Data
US 2023/0188398 A1    Jun. 15, 2023

Related U.S. Application Data

(63) Continuation of application No. PCT/EP2021/072101, filed on Aug. 6, 2021.

(30) Foreign Application Priority Data

Aug. 6, 2020    (EP) .................................... 20189908

(51) Int. Cl.
*H04L 27/26* (2006.01)
*G01S 1/04* (2006.01)
(Continued)

(52) U.S. Cl.
CPC ........ *H04L 27/2613* (2013.01); *G01S 1/0428* (2019.08); *G01S 5/0215* (2013.01); *H04L 5/0007* (2013.01)

(58) Field of Classification Search
CPC .............. H04L 27/2613; H04L 5/0007; H04L 27/2602; H04L 27/261; G01S 1/0428; G01S 5/0215; H04W 72/0453
See application file for complete search history.

(56) References Cited

U.S. PATENT DOCUMENTS

| | | | |
|---|---|---|---|
| 2010/0062783 A1* | 3/2010 | Luo ........................ | H04L 5/0048 455/450 |
| 2018/0048508 A1* | 2/2018 | Yoon ..................... | H04W 72/21 |

(Continued)

FOREIGN PATENT DOCUMENTS

EP    3681226 A1    7/2020

OTHER PUBLICATIONS

Fraunhofer Iis et al.: "Remaining details on SRS enhancements for positioning", 3GPP Draft; R1-1913101, RAN WG1, No. Reno, NV, USA; 20191 118-20191 122 Nov. 8, 2019, XP051820305.

(Continued)

*Primary Examiner* — Khanh C Tran
(74) *Attorney, Agent, or Firm* — Perkins Coie LLP; Michael A. Glenn

(57) ABSTRACT

An apparatus for a wireless communication system is provided. The apparatus is to transmit a reference signal on a common set of resource elements (REs), the common set of resource elements being used by one or more further apparatuses in the wireless communication system, so that the reference signal of the apparatus and one or more further reference signals of the one or more further apparatuses use the same resource elements. Moreover, the apparatus is to transmit the reference signal depending on a base sequence or a sequence derived from the base sequence and depending on a set of configuration parameters.

37 Claims, 26 Drawing Sheets

(51) Int. Cl.
 *G01S 5/02* (2010.01)
 *H04L 5/00* (2006.01)

(56) References Cited

U.S. PATENT DOCUMENTS

| | | | |
|---|---|---|---|
| 2019/0044775 A1* | 2/2019 | Zhang | ................. H04L 27/2607 |
| 2020/0014507 A1 | 1/2020 | Joseph et al. | |
| 2022/0271982 A1* | 8/2022 | Alawieh | ............. H04L 27/2602 |

OTHER PUBLICATIONS

Huawei et al.: "SRS design for NR positioning", 3GPP Draft; R1-1911343, Oct. 20, 2019, pp. 1-20, XP051 790105.

* cited by examiner

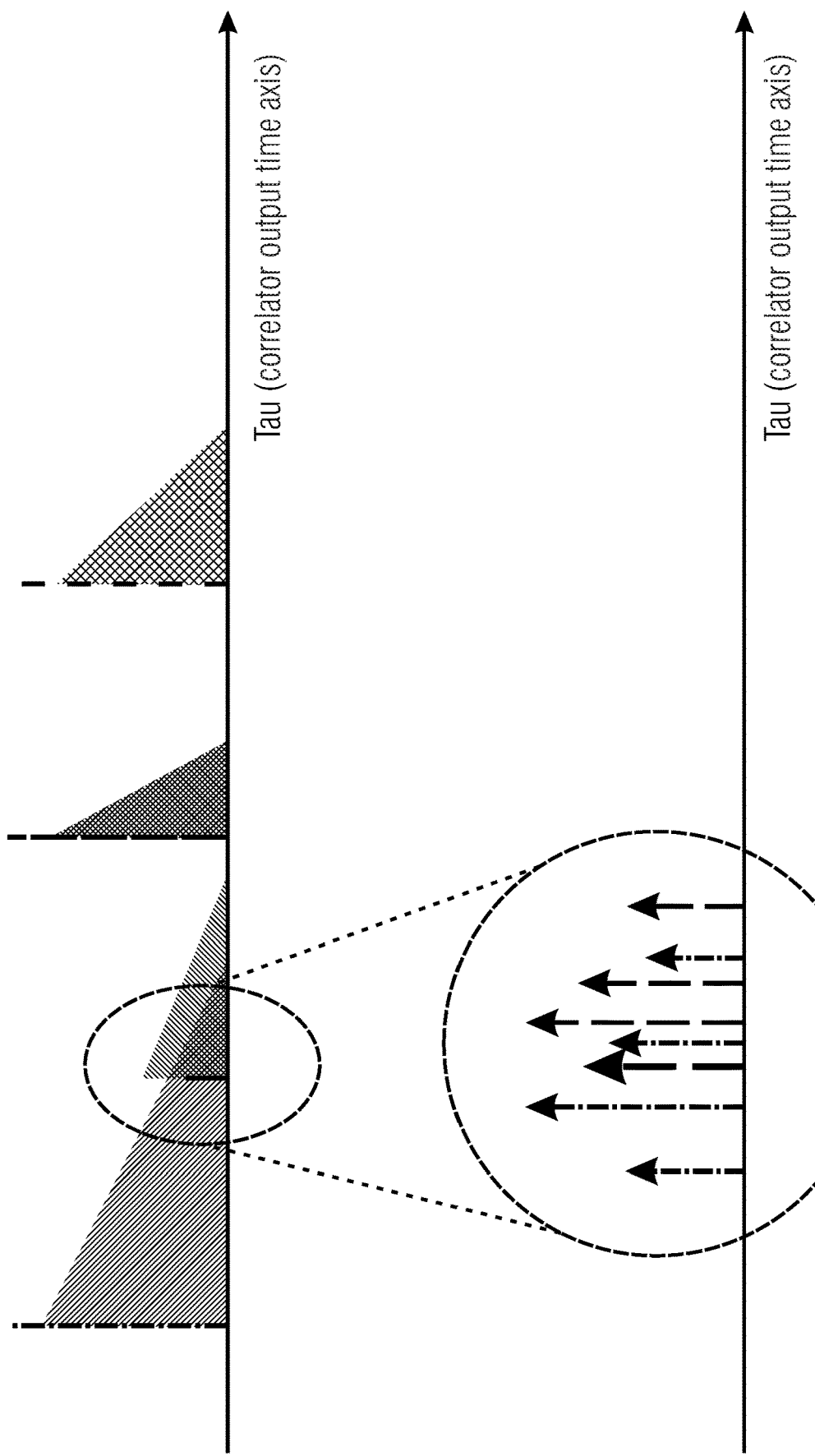

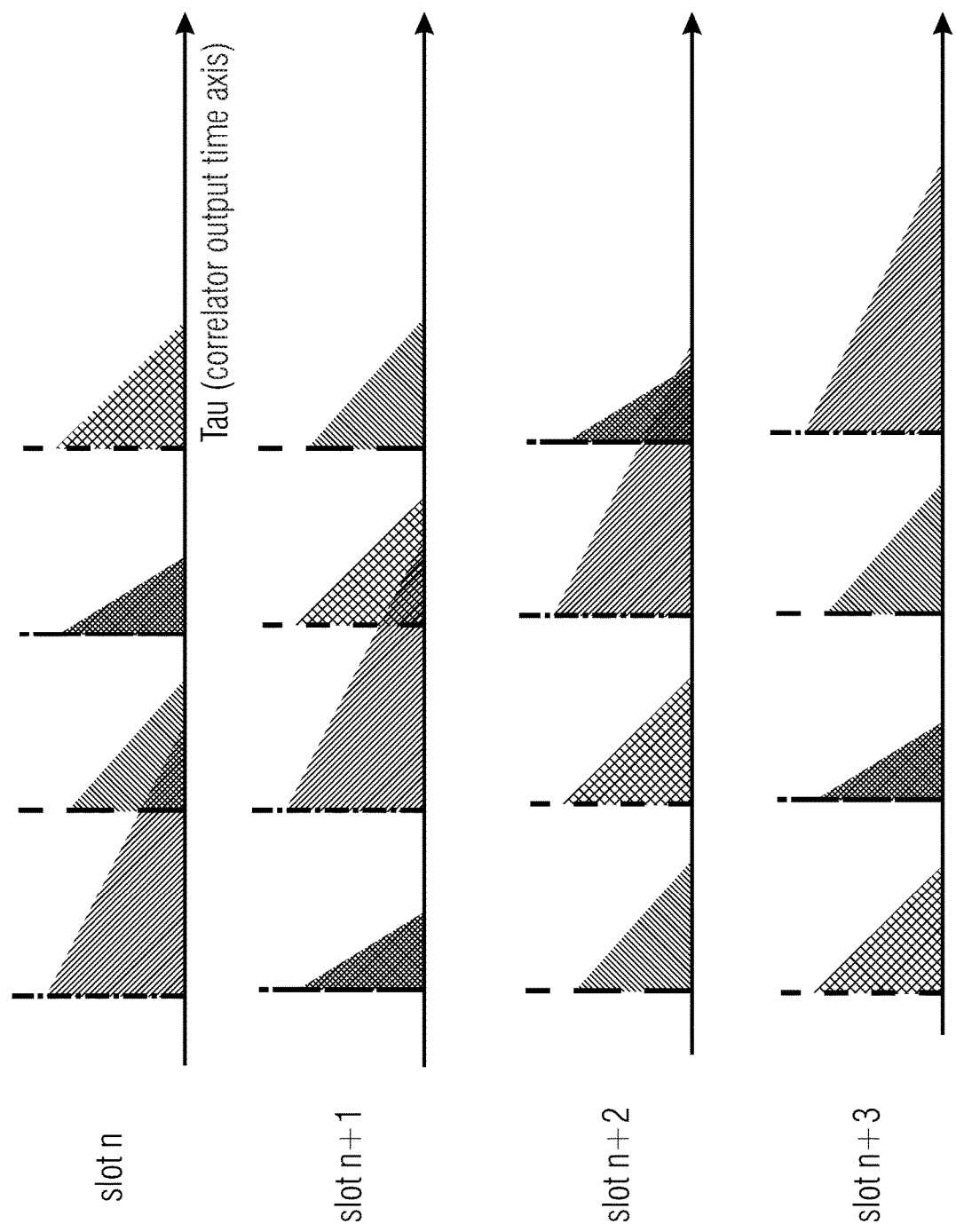

Fig. 11 (Part 1)

| UE=1 | UE=2 | UE=3 | UE=4 | UE=5 | ... | UE=12 |
|---|---|---|---|---|---|---|
| CS=0 | CS=1 | CS=2 | CS=3 | CS=4 | ... | CS=11 |
| CS=1 | CS=3 | CS=0 | CS=2 | CS=5 | ... | CS=10 |
| CS=2 | CS=0 | CS=3 | CS=1 | CS=6 | ... | CS=9 |
| CS=3 | CS=2 | CS=2 | CS=0 | CS=7 | ... | CS=8 |
| CS=0 | CS=1 | CS=2 | CS=3 | CS=4 | ... | CS=11 |

Fig. 11 (Part 2)

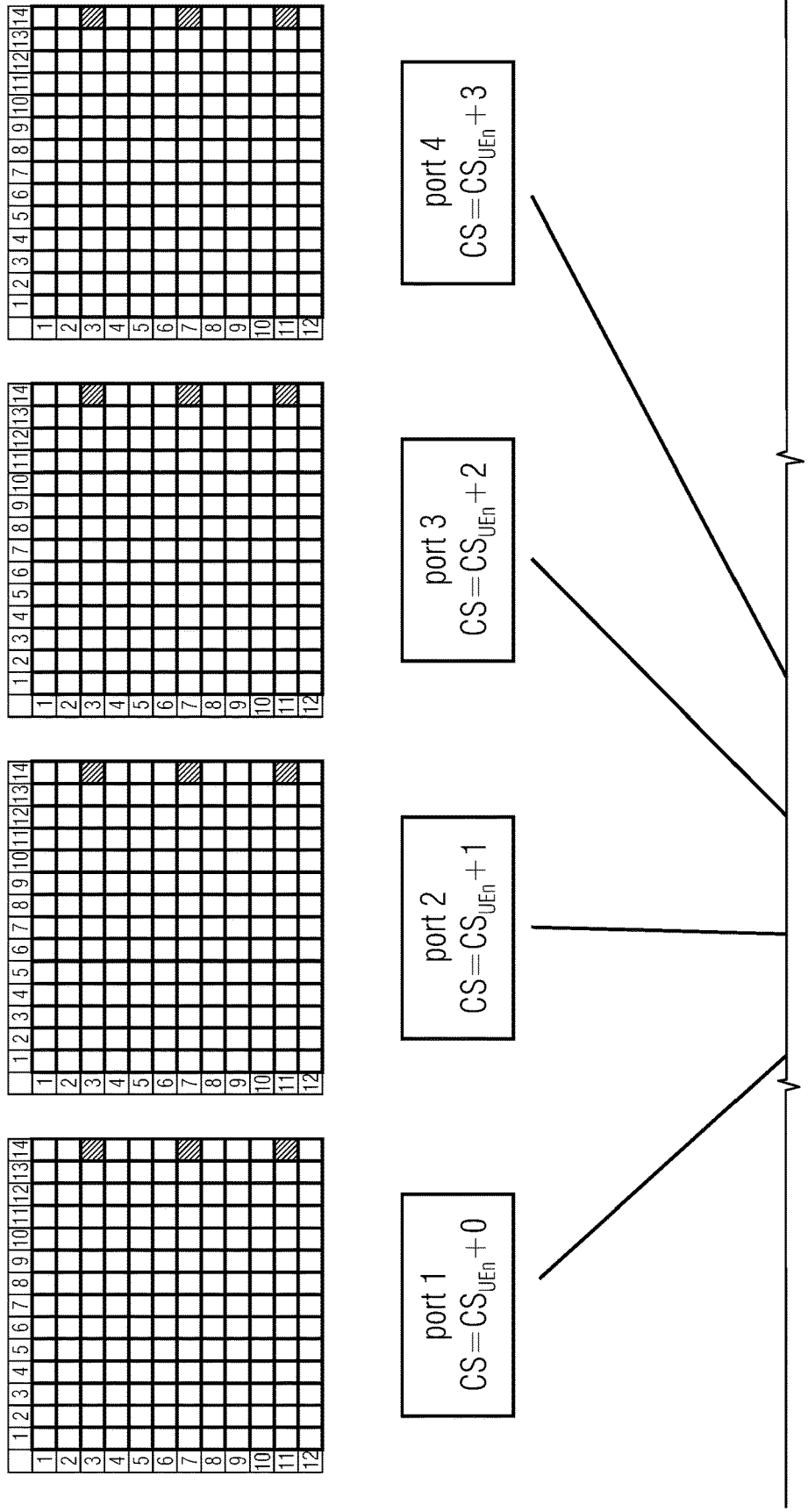
Fig. 15 (Part 1)

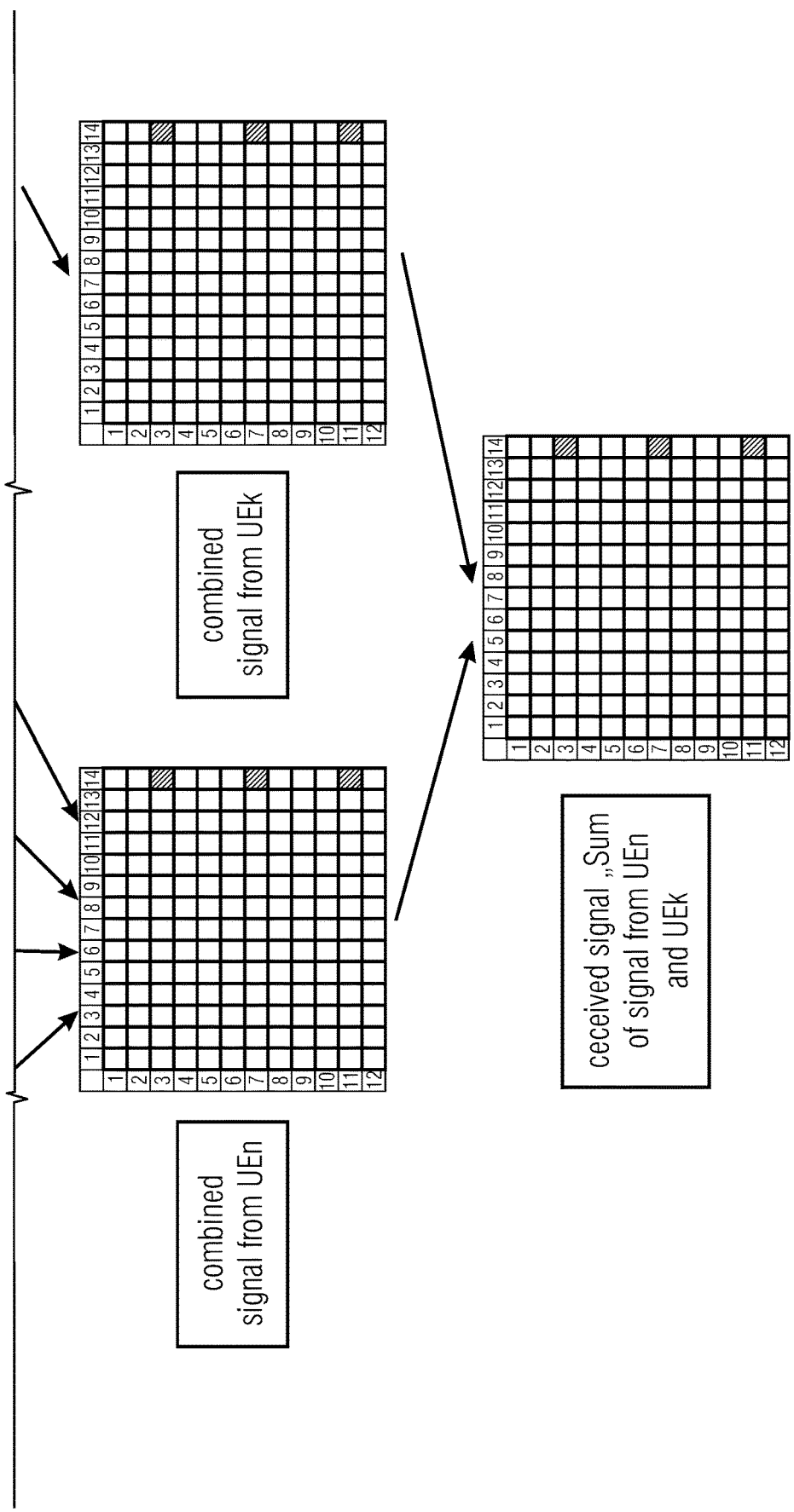
Fig. 15 (Part 2)

APPARATUS AND METHOD FOR A WIRELESS COMMUNICATION SYSTEM EMPLOYING CYCLIC SHIFT HOPPING

CROSS-REFERENCE TO RELATED APPLICATIONS

This application is a continuation of copending International Application No. PCT/EP2021/072101, filed Aug. 6, 2021, which is incorporated herein by reference in its entirety, and additionally claims priority from European Application No. EP20189908.5, filed Aug. 6, 2020, which is also incorporated herein by reference in its entirety.

The present invention relates to wireless communication systems and, in particular, to an apparatus and a method for a wireless communication system employing cyclic shift hopping.

BACKGROUND OF THE INVENTION

FIG. 18 is a schematic representation of an example of a terrestrial wireless network 100 including, as is shown in FIG. 18(a), the core network and one or more radio access networks $RAN_1$, $RAN_2$, ... $RAN_N$ (RAN=Radio Access Network). FIG. 18(b) is a schematic representation of an example of a radio access network $RAN_n$ that may include one or more base stations $gNB_1$ to $gNB_5$ (gNB=next generation Node B), each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/ LTE-A Pro, or just a BS in other mobile communication standards. A user may be a stationary device or a mobile device. The wireless communication system may also be accessed by mobile or stationary IoT (Internet of Things) devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 18(b) shows an exemplary view of five cells, however, the $RAN_n$ may include more or less such cells, and $RAN_n$ may also include only one base station. FIG. 18(b) shows two users $UE_1$ and $UE_2$, (UE=User Equipment) also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 18(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base stations $gNB_1$ to $gNB_5$ may be connected to the core network 102, e.g. via the S1 interface, via respective backhaul links $114_1$ to $114_5$, which are schematically represented in FIG. 18(b) by the arrows pointing to "core". The core network 102 may be connected to one or more external networks. The external network may be the Internet or a private network, such as an intranet or any other type of campus networks, e.g. a private WiFi or 4G or 5G mobile communication system. Further, some or all of the respective base stations $gNB_1$ to $gNB_5$ may be connected, e.g. via the S1 or X2 interface or the XN interface in NR (New Radio), with each other via respective backhaul links $116_1$ to $116_5$, which are schematically represented in FIG. 18(b) by the arrows pointing to "gNBs". A sidelink channel allows direct communication between UEs, also referred to as device-to-device, D2D (Device to Device), communication. The sidelink interface in 3GPP (3G Partnership Project) is named PC5 (Proximity-based Communication 5).

For data transmission a physical resource grid may be used. The physical resource grid may comprise a set of resource elements to which various physical channels and physical signals are mapped. For example, the physical channels may include the physical downlink, uplink and sidelink shared channels, PDSCH (Physical Downlink Shared CHannel), PUSCH (Physical Uplink Shared Channel), PSSCH (Physical Sidelink Shared Channel), carrying user specific data, also referred to as downlink, uplink and sidelink payload data, the physical broadcast channel, PBCH (Physical Broadcast Channel), carrying for example a master information block, MIB, and one or more of a system information block, SIB, one or more sidelink information blocks, SLIBs, if supported, the physical downlink, uplink and sidelink control channels, PDCCH (Physical Downlink Control Channel), PUCCH (Physical Uplink Control CHannel), PSCCH (Physical Sidelink Control Channel), the downlink control information, DCI, the uplink control information, UCI, and the sidelink control information, SCI, and physical sidelink feedback channels, PSFCH (Physical sidelink feedback channel), carrying PC5 feedback responses. Note, the sidelink interface may support a 2-stage SCI (Speech Call Items). This refers to a first control region comprising some parts of the SCI, and, optionally, a second control region, which comprises a second part of control information.

For the uplink, the physical channels may further include the physical random-access channel, PRACH (Packet Random Access Channel) or RACH (Random Access Channel), used by UEs for accessing the network once a UE synchronized and obtained the MIB and SIB. The physical signals may comprise reference signals, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols (OFDM=Orthogonal Frequency-Division Multiplexing) depending on the cyclic prefix, CP, length. A frame may also include of a smaller number of OFDM symbols, e.g. when utilizing a shortened transmission time interval, sTTI (slot or subslot transmission time interval), or a mini-slot/non-slot-based frame structure comprising just a few OFDM symbols.

The wireless communication system may be any single-tone or multicarrier system using frequency-division multiplexing, like orthogonal frequency-division multiplexing, OFDM, or orthogonal frequency-division multiple access, OFDMA (Orthogonal frequency-division multiple access), or any other IFFT-based signal (IFFT=Inverse Fast Fourier Transformation) with or without CP, e.g. DFT-s-OFDM (DFT=discrete Fourier transform). Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 18 may be a heterogeneous network having distinct overlaid networks, e.g., a network of macro cells with each macro cell including a macro base station, like base stations $gNB_1$ to $gNB_5$, and a network of small cell base stations, not shown in FIG. 18, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 18, for example in accordance with the LTE-Advanced Pro standard or the 5G or NR, new radio, standard.

In mobile communication networks, for example in a network like that described above with reference to FIG. 18, like an LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, or roadside entities, like traffic lights, traffic signs, or pedestrians. An RSU may have a functionality of a BS or of a UE, depending on the specific network configuration. Other UEs may not be vehicular related UEs and may comprise any of the above-mentioned devices. Such devices may also communicate directly with each other, D2D communication, using the SL channels.

In a wireless communication network, like the one depicted in FIG. 18, it may be desired to locate a UE with a certain accuracy, e.g., determine a position of the UE in a cell. Several positioning approaches are known, like satellite-based positioning approaches, e.g., autonomous and assisted global navigation satellite systems, A-GNSS, such as GPS, mobile radio cellular positioning approaches, e.g., observed time difference of arrival, OTDOA, and enhanced cell ID, E-CID, or combinations thereof.

It is noted that the information in the above section is only for enhancing the understanding of the background of the invention and, therefore, it may comprise information that does not form conventional technology that is already known to a person of ordinary skill in the art.

For minimizing the number of needed resource elements (REs) for positioning UEs can share the same OFDM symbols. Using sequences with good auto correlation properties such as the Zadoff-Chu sequence in combination with cyclic shifts allows the separation correlation peaks related to the wanted UE from the correlation peaks resulting from the signals transmitted from other UEs within the same OFDM symbol. In case of high delay spread or non-ideal transmit timing the correlation functions may overlap and it may be difficult to distinguish peaks related to the wanted UE from peaks resulting from interfering UEs.

Known solutions in the art extend the allowed delay range using one or combinations of the following methods:

An extension of the OFDM symbol duration by reducing the subcarrier spacing. This increases the sensitivity to frequency offsets and Doppler effects.

An increase the cyclic shift. This reduces the number of UEs sharing the same OFDM symbol.

A reduction of the COMB factor. This reduces the number of UEs sharing the OFDM symbol by frequency multiplex.

Another method uses several symbols in combination with "staggering" and related phase correction. This solution may be advantageous if due to power limitations several symbols are needed to increase the effective SNR. But this method also increases the number of needed REs per SRS transmission.

By allowing only a reduced number of UEs that sharing the same RE, more REs are needed for a plurality of UEs, and the needed capacity share per UE is higher.

Starting from the above, there may be a need for improvements or enhancements for a wireless communication system or network and its components.

It would therefore be highly appreciated, if improved concepts for wireless communication systems would be provided.

SUMMARY

An embodiment may have an apparatus for a wireless communication system, wherein the apparatus is to transmit a reference signal on a common set of resource elements (REs), the common set of resource elements being used by one or more further apparatuses in the wireless communication system, so that the reference signal of the apparatus and one or more further reference signals of the one or more further apparatuses use the same resource elements, wherein the apparatus is to transmit the reference signal depending on a base sequence or a sequence derived from the base sequence and depending on a set of configuration parameters.

Another embodiment may have an apparatus for receiving a reference signal of a wireless communication system, wherein the apparatus for receiving is to receive a reference signal from another apparatus on a common set of resource elements (REs), the common set of resource elements being used by the other apparatus and one or more further apparatuses in the wireless communication system, so that the reference signal from the other apparatus and one or more further reference signals from the one or more further apparatuses use the same resource elements, wherein the reference signal from the other apparatus depends on a base sequence or a sequence derived from the base sequence and depending on a set of configuration parameters, wherein the apparatus for receiving is to differentiate the reference signals transmitted from a plurality of other apparatuses, which includes the other apparatus, and the one or more further reference signals from the one or more further apparatuses by jointly analyzing a set of received symbols or by forwarding the set of received symbols to another apparatus for further processing.

Another embodiment may have a network node of a wireless communication system, wherein the network node is to provide information on a set of configuration parameters to another apparatus of the wireless communication system, wherein the other apparatus is to transmit or receive a reference signal on a common set of resource elements (REs), the common set of resource elements being used by one or more further apparatuses in the wireless communication system, so that the reference signal of the other apparatus and one or more further reference signals of the one or more further apparatuses use the same resource elements, wherein the other apparatus is to transmit the reference signal depending on a base sequence or a sequence derived from the base sequence and depending on the set of configuration parameters provided by the network node.

Another embodiment may have a network node for a wireless communication system, wherein the network node is to receive a message from an apparatus including information on a reference signal transmitted from another apparatus on a common set of resource elements, the common set of resource elements being used by a plurality of antenna ports of the other apparatus and/or one or more further apparatuses in the wireless communication system, so that the reference signal from the other apparatus and one or more further reference signals from the one or more further apparatuses use the same resource elements, wherein the message includes information relating to one or more additional paths found in the current slot which are associated with one or more previously found paths in one or more previous measurement, and wherein the network node is to apply transmission sequence information to differentiate the plurality of antenna ports of the other apparatus and/or one or more further apparatuses.

According to another embodiment, a wireless communication system may have: at least two apparatuses for a wireless communication system, wherein the apparatus is to transmit a reference signal on a common set of resource elements (REs), the common set of resource elements being used by one or more further apparatuses in the wireless communication system, so that the reference signal of the apparatus and one or more further reference signals of the one or more further apparatuses use the same resource elements, wherein the apparatuses are to transmit the reference signal depending on a base sequence or a sequence derived from the base sequence and depending on a set of configuration parameters, and at least one apparatus for receiving a reference signal of a wireless communication system, wherein the apparatus for receiving is to receive a reference signal from another apparatus on a common set of resource elements (REs), the common set of resource elements being used by the other apparatus and one or more further apparatuses in the wireless communication system, so that the reference signal from the other apparatus and one or more further reference signals from the one or more further apparatuses use the same resource elements, wherein the reference signal from the other apparatus depends on a base sequence or a sequence derived from the base sequence and depending on a set of configuration parameters, wherein the apparatus for receiving is to differentiate the reference signals transmitted from a plurality of other apparatuses, which includes the other apparatus, and the one or more further reference signals from the one or more further apparatuses by jointly analyzing a set of received symbols or by forwarding the set of received symbols to another apparatus for further processing, wherein the apparatus for receiving a reference signal of a wireless communication system is to receive a reference signal from at least one of the at least two apparatuses for a wireless communication system.

According to another embodiment, a method for a wireless communication system may have the steps of: transmitting a reference signal by an apparatus on a common set of resource elements, the common set of resource elements being used by one or more further apparatuses in the wireless communication system, so that the reference signal of the apparatus and one or more further reference signals of the one or more further apparatuses use the same resource elements, and transmitting the reference signal depending on a base sequence or a sequence derived from the base sequence and depending on a set of configuration parameters.

Another embodiment may have a method for receiving a reference signal of a wireless communication system, wherein the method includes receiving, by an apparatus for receiving, a reference signal from another apparatus on a common set of resource elements (REs), wherein the common set of resource elements are used by the other apparatus and one or more further apparatuses in the wireless communication system, so that the reference signal from the other apparatus and one or more further reference signals from the one or more further apparatuses use the same resource elements, wherein the reference signal from the other apparatus depends on a base sequence or a sequence derived from the base sequence and depending on a set of configuration parameters, wherein the apparatus for receiving differentiates the reference signals transmitted from a plurality of other apparatuses, which includes the other apparatus, and the one or more further reference signals from the one or more further apparatuses by jointly analyzing a set of received symbols or by forwarding the set of received symbols to another apparatus for further processing.

Another embodiment may have a method for a wireless communication system, wherein a network node provides information on a set of configuration parameters to another apparatus of the wireless communication system, wherein the other apparatus transmits a reference signal on a common set of resource elements, wherein the common set of resource elements are used by one or more further apparatuses in the wireless communication system, so that the reference signal of the other apparatus and one or more further reference signals of the one or more further apparatuses use the same resource elements, wherein the other apparatus transmits the reference signal depending on a base sequence or a sequence derived from the base sequence and depending on the set of configuration parameters provided by the network node.

Another embodiment may have a method for a wireless communication system, wherein a network node receives a message from an apparatus including information on a reference signal transmitted from another apparatus on a common set of resource elements, the common set of resource elements being used by a plurality of antenna ports of the other apparatus and/or one or more further apparatuses in the wireless communication system, so that the reference signal from the other apparatus and one or more further reference signals from the one or more further apparatuses use the same resource elements, wherein the message includes information relating to one or more additional paths found in the current slot which are associated with one or more previously found paths in one or more previous measurement, and wherein the network node applies transmission sequence information to differentiate the plurality of antenna ports of the other apparatus and/or one or more further apparatuses.

Another embodiment may have a non-transitory digital storage medium having a computer program stored thereon to perform any of the inventive methods when said computer program is run by a computer.

An apparatus for a wireless communication system is provided. The apparatus is to transmit a reference signal on a common set of resource elements (REs), the common set of resource elements being used by one or more further apparatuses in the wireless communication system, so that the reference signal of the apparatus and one or more further reference signals of the one or more further apparatuses use the same resource elements. Moreover, the apparatus is to transmit the reference signal depending on a base sequence or a sequence derived from the base sequence and depending on a set of configuration parameters.

In an embodiment, the set of configuration parameters may, e.g., be a set of cyclic shift parameters (shift pattern).

Moreover, an apparatus for receiving a reference signal of a wireless communication system is provided. The apparatus for receiving is to receive a reference signal from another apparatus on a common set of resource elements, the common set of resource elements being used by the other apparatus and one or more further apparatuses in the wireless communication system, so that the reference signal from the other apparatus and one or more further reference signals from the one or more further apparatuses use the same resource elements. The reference signal from the other apparatus depends on a base sequence or a sequence derived from the base sequence and depending on a set of configuration parameters. The apparatus for receiving is to differentiate the reference signals transmitted from a plurality of other apparatuses, which includes the other apparatus, and the one or more further reference signals from the one or more further apparatuses by jointly analyzing a set of received symbols or by forwarding the set of received symbols to another apparatus for further processing.

Furthermore, a network node of a wireless communication system is provided. The network node is to provide information on a set of configuration parameters to another apparatus of the wireless communication system. The other apparatus is to transmit a reference signal on a common set of resource elements, the common set of resource elements being used by one or more further apparatuses in the wireless communication system, so that the reference signal of the other apparatus and one or more further reference signals of the one or more further apparatuses use the same resource elements. Furthermore, the other apparatus is to transmit the reference signal depending on a base sequence or a sequence derived from the base sequence and depending on the set of configuration parameters provided by the network node.

Moreover, a network node for a wireless communication system is provided. The network node is to receive a message from an apparatus comprising information on a reference signal transmitted from another apparatus on a common set of resource elements, the common set of resource elements being used by a plurality of antenna ports of the other apparatus and/or one or more further apparatuses in the wireless communication system, so that the reference signal from the other apparatus and one or more further reference signals from the one or more further apparatuses use the same resource elements. The message comprises information relating to one or more additional paths found in the current slot which are associated with one or more previously found paths in one or more previous measurement. The network node is to apply transmission sequence information to differentiate the plurality of antenna ports of the other apparatus and/or one or more further apparatuses.

Furthermore, a method for a wireless communication system is provided. The method comprises transmitting a reference signal by an apparatus on a common set of resource elements, the common set of resource elements being used by one or more further apparatuses in the wireless communication system, so that the reference signal of the apparatus and one or more further reference signals of the one or more further apparatuses use the same resource elements. Furthermore, the method comprises transmitting the reference signal depending on a base sequence or a sequence derived from the base sequence and depending on a set of configuration parameters.

Moreover, a method for receiving a reference signal of a wireless communication system is provided. The method comprises receiving, by an apparatus for receiving, a reference signal from another apparatus on a common set of resource elements (REs), wherein the common set of resource elements are used by the other apparatus and one or more further apparatuses in the wireless communication system, so that the reference signal from the other apparatus and one or more further reference signals from the one or more further apparatuses use the same resource elements. The reference signal from the other apparatus depends on a base sequence or a sequence derived from the base sequence and depending on a set of configuration parameters. The apparatus for receiving differentiates the reference signals transmitted from a plurality of other apparatuses, which comprises the other apparatus, and the one or more further reference signals from the one or more further apparatuses by jointly analyzing a set of received symbols or by forwarding the set of received symbols to another apparatus for further processing.

Furthermore, a method for a wireless communication system is provided. A network node provides information on a set of configuration parameters to another apparatus of the wireless communication system. The other apparatus transmits a reference signal on a common set of resource elements, wherein the common set of resource elements are used by one or more further apparatuses in the wireless communication system, so that the reference signal of the other apparatus and one or more further reference signals of the one or more further apparatuses use the same resource elements, wherein the other apparatus transmits the reference signal depending on a base sequence or a sequence derived from the base sequence and depending on the set of configuration parameters provided by the network node.

Moreover, a method for a wireless communication system is provided. A network node receives a message from an apparatus comprising information on a reference signal transmitted from another apparatus on a common set of resource elements, the common set of resource elements being used by a plurality of antenna ports of the other apparatus and/or one or more further apparatuses in the wireless communication system, so that the reference signal from the other apparatus and one or more further reference signals from the one or more further apparatuses use the same resource elements. The message comprises information relating to one or more additional paths found in the current slot which are associated with one or more previously found paths in one or more previous measurement. The network node applies transmission sequence information to differentiate the plurality of antenna ports of the other apparatus and/or one or more further apparatuses.

Moreover, computer programs are provided, wherein each of the computer programs is configured to implement one of the above-described methods when being executed on a computer or signal processor.

BRIEF DESCRIPTION OF THE DRAWINGS

Embodiments of the present invention will be detailed subsequently referring to the appended drawings, in which:

FIG. 2 illustrates an example for a critical overlap of the CIRs.

FIG. 3 illustrates an example for cyclic shift hopping over four slots.

FIG. 4a illustrates a single SRS resource with a parameter $K_{TC}=4$.

FIG. 4b illustrates frequency multiplex of two SRS resources.

FIG. 4d illustrates time multiplex of two SRS resources and with different COMB-Offset.

FIG. 4e illustrates code multiplex/"cyclic shift Multiplex", wherein the two SRS resources share the same REs.

FIGS. 10a, 10b depict details of received CIR for a UE, wherein FIG. 10a depicts an individual CIR, and wherein FIG. 10b depicts a combined signal according to an embodiment..

FIG. 15 illustrates an example for the principle of multiplexing signals from different antenna ports to the same REs, if the UE supports the parallel transmission over several antenna ports according to an embodiment.

DETAILED DESCRIPTION OF THE INVENTION

Figure 1:
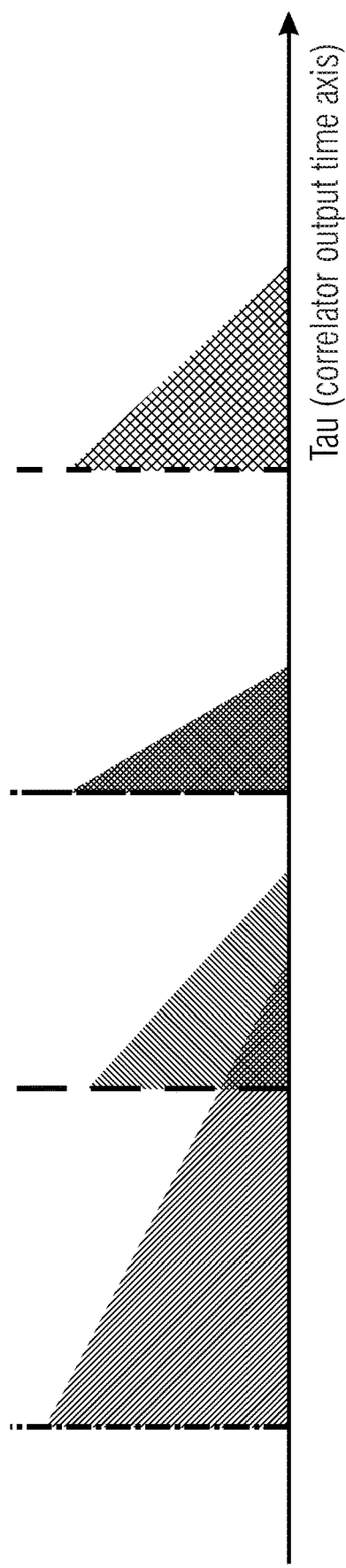
FIG. 1 illustrates characteristics of the correlator output if 4 UEs with different cyclic shifts share the same OFDM symbol.

An apparatus for a wireless communication system is provided.

The apparatus is to transmit a reference signal on a common set of resource elements (REs), the common set of resource elements being used by one or more further apparatuses in the wireless communication system, so that the reference signal of the apparatus and one or more further reference signals of the one or more further apparatuses use the same resource elements.

Moreover, the apparatus is to transmit the reference signal depending on a base sequence or a sequence derived from the base sequence and depending on a set of configuration parameters.

In an embodiment, the set of configuration parameters may, e.g., be a set of cyclic shift parameters (shift pattern).

According to an embodiment, to transmit the reference signal, the apparatus may, e.g., be to realize a cyclic shift in time of a signal component indicating the base sequence or indicating the sequence derived from the base sequence depending on the set of configuration parameters defining one or more sequences of cyclic shifts.

In an embodiment, the apparatus may, e.g., be to realize the cyclic shift in time of the signal component indicating the base sequence or indicating the sequence derived from the base sequence by determining intermediate versions of resource elements of the common set of resource elements depending on the base sequence, and by applying a phase ramp to the intermediate versions of the resource elements depending on a set of configuration parameters.

For example, the base sequence may, e.g., mapped to a plurality of resource elements (e.g., to obtain intermediate versions of the resource elements). Realizing a cyclic shift in time of the signal component that indicates the base sequence may, for example, be implemented in a frequency domain, for example, in a DFT or FFT domain. For example, if the signal component indicating the base sequence shall be cyclically shifted by x microseconds, a phase ramp gradient, which defines the phase ramp, may, e.g., be calculated based on the properties of, for example, the DFT or FFT transformation, and the resulting phase ramp may, e.g., be applied on the plurality of resource elements, to which the base sequence has been mapped (e.g., on the intermediate versions of the resource elements).

According to an embodiment, to transmit a first version of the reference signal, the apparatus may, e.g., be to realize a first cyclic shift in time of the signal component indicating the base sequence or indicating a sequence derived from the base sequence depending on the set of configuration parameters. To transmit a second version of the reference signal, the apparatus may, e.g., be to realize a second cyclic shift in time of the signal component indicating the base sequence or indicating a sequence derived from the base sequence depending on the set of configuration parameters; wherein the second cyclic shift may, e.g., be different from the first cyclic shift.

In an embodiment, the apparatus may, e.g., be to transmit the first version of the reference signal in one or more symbols of a first one of a plurality of slots. The apparatus may, e.g., be to transmit the second version of the reference signal in one or more symbols of a second one of the plurality of slots.

According to an embodiment, the apparatus comprises two or more antenna ports. The apparatus may, e.g., be to transmit a different version of the reference signal for each antenna port of two or more antenna ports depending on the base sequence or the sequence derived from the base sequence and depending on the set of configuration parameters.

In an embodiment, the apparatus may, e.g., be to realize for each of the two or more antenna ports, a cyclic shift in time of the signal component indicating the base sequence or indicating the sequence derived from the base sequence depending on the set of configuration parameters defining one or more sequences of cyclic shifts, such that the cyclic shift in time for a first one of two or more antenna ports may, e.g., be different from the cyclic shift in time for a second one of two or more antenna ports.

In embodiments, a plurality of antenna ports may, e.g., be employed. Different embodiments are provided:

For example, a UE may, e.g., comprise a plurality of antennas/antenna ports. A UE with a plurality of L antennas/antenna ports may, e.g., be implemented similarly as L UEs. However, for example, possibly, parameters may, for example, be chosen differently.

In other embodiments, base stations with a plurality of beams may, e.g., be employed. Then there are M*K downlink signals, wherein M may, e.g., the number of base stations (or antenna-array positions) and K may, e.g., be a number of beams per base station (or per antenna-array position).

In further embodiments, a plurality of small 'anchors' may, e.g., be employed. Then, a UE may, e.g., be an anchor at a known position, or, e.g., a 'beacon' may, e.g., be employed.

According to an embodiment, the apparatus may, e.g., be to receive information on the set of configuration parameters by a network node of the wireless communication system.

In an embodiment, the apparatus may, e.g., be to receive information on the set of configuration parameters within an RRC message, and/or within downlink control information, and/or within a Media Access Control Element, and/or within an LTE Positioning Protocol.

According to an embodiment, the set of configuration parameters employed by the apparatus may, e.g., be different from any further set of configuration parameters employed by any of the one or more further apparatuses for transmitting one of the one or more further reference signals.

In an embodiment, the base sequence may, e.g., be a sequence with zero auto-correlation properties.

According to an embodiment, the base sequence may, e.g., be a Zadoff-Chu sequence.

In an embodiment, the apparatus may, e.g., be to employ OFDM modulation. The plurality of symbols may, e.g., be a plurality of OFDM symbols. The apparatus may, e.g., be to apply, for each OFDM symbol of the plurality of OFDM symbols, the transmission sequence for said OFDM symbol on said OFDM symbol.

According to an embodiment, the apparatus may, e.g., be to employ two or more antennas, such that each of the two or more antennas transmits a version of the reference signal, wherein the version of the reference signal transmitted by a first one of the two or more antennas may, e.g., be different from the version of the reference signal transmitted by a second one of the two or more antennas.

In an embodiment, the common set of resource elements may, e.g., be a common set of time/frequency resource elements.

According to an embodiment, each of a plurality of functions defines a cyclic shift parameter set. The apparatus may, e.g., be to receive information which function to choose out of the plurality of functions to determine the set of configuration parameters.

In an embodiment, the apparatus may, e.g., be to receive an indication of a muting for one or more resource elements of the common set of resource elements.

According to an embodiment, the set of configuration parameters defines one or more cyclic shift values.

In an embodiment, the set of configuration parameters defines N cyclic shift values. The set of configuration parameters has a periodicity of N symbols such that the N cyclic shift values may, e.g., be repeated after N symbols.

According to an embodiment, the set of configuration parameters comprises N cyclic shift values, wherein for each pair of a first cyclic shift value and a second cyclic shift value of the N cyclic shift values, the second cyclic shift value may, e.g., be different from the first cyclic shift value.

In an embodiment, the one or more cyclic shift values of the set of configuration parameters depend on at least one of
 a cyclic shift index provided by another entity of the wireless communication system,
 an index pattern pattern$_i$ provided by a further entity of the wireless communication system,
 a slot number of a radio frame,
 an OFDM symbol number,
 an OFDM symbol index of a slot that corresponds to the a OFDM symbol of an SRS transmission in the given slot,
 an antenna port of the apparatus.

According to an embodiment, a cyclic shift value of the one or more cyclic shift values of the set of configuration parameters defines by how much time the base sequence may, e.g., be cyclically shifted in time depends on a comb factor and on a cyclic shift index.

In an embodiment, said cyclic shift value further depends on a duration of said symbol.

According to an embodiment, a distance dτ between the correlation peaks of two sequences using different cyclic shifts may, e.g., be defined by $$d\tau = \frac{1}{SCS} \cdot \frac{1}{K_{TC}} \cdot \left( \frac{n_{SRS,}^{cs,UEj}}{n_{SRS}^{cs,max}} - \frac{n_{SRS}^{cs,UEi}}{n_{SRS}^{cs,max}} \right)$$

$$d\tau = \frac{1}{SCS} \cdot \frac{1}{K_{TC}} \cdot \left( \frac{n_{SRS,}^{cs,UEj}}{n_{SRS}^{cs,max}} - \frac{n_{SRS}^{cs,UEi}}{n_{SRS}^{cs,max}} \right)$$

$$d\tau = \frac{1}{SCS} \cdot \frac{1}{K_{TC}} \cdot \left( \frac{n_{SRS,}^{cs,UEj}}{n_{SRS}^{cs,max}} - \frac{n_{SRS}^{cs,UEi}}{n_{SRS}^{cs,max}} \right)$$

wherein SCS indicates a sub carrier spacing, wherein $K_{TC}$ indicates the comb factor, wherein $n_{SRS}^{cs}$ indicates the cyclic shift index, wherein $n_{SRS}^{cs,UEj}$ indicates a selected value for the apparatus, wherein $n_{SRS,}^{cs,UEi}$ indicates a selected value for an i-th apparatus of the one or more further apparatuses, wherein $n_{SRS}^{cs,max}$ indicates a number of cyclic shift steps.

In an embodiment, at least one of the one or more cyclic shift values may, e.g., be a cyclic shift value $\alpha_{initial}$ for an antenna port being defined as $$\alpha_{initial} = 2\pi \frac{n_{SRS}^{cs,i}}{n_{SRS}^{cs,max}}$$

$$\text{wherein } n_{SRS}^{cs,i} = \left( n_{SRS}^{eff} + \frac{n_{SRS}^{cs,max}(p_i - 1000)}{N_{AP}} \right) \bmod n_{SRS}^{cs,max}$$

wherein $n_{SRS}^{cs,max}$ represents a maximum number of cyclic shifts, wherein $p_i$ indicates an $^{sRs}$antenna port identifier, wherein $N_{AP}$ indicates a number of the antenna ports, wherein $n_{SRS}^{eff}$ indicates an effective cyclic index.

According to an embodiment, at least one of the one or more cyclic shift values may, e.g., be a cyclic shift value $\alpha_{eff}(n_{s,f}^\mu, 1, 1')$ for an antenna port being defined as $$\alpha_{eff}(n_{s,f}^\mu, l, l') = 2\pi \frac{n_{SRS}^{cs,i}(n_{s,f}^\mu, l, l')}{n_{SRS}^{cs,max}} + 2\pi \left\lfloor \frac{n_{SRS}^{eff}(n_{s,f}^\mu, l, l')}{n_{SRS}^{cs,max}} \right\rfloor$$

$$\text{wherein } n_{SRS}^{cs,i} = \left(n_{SRS}^{eff} + \frac{n_{SRS}^{cs,max}(p_i - 1000)}{N_{AP}}\right) \bmod n_{SRS}^{cs,max}$$

wherein $n_{SRS}^{cs,max}$ represents a maximum number of cyclic shifts, wherein $p_i$ indicates an antenna port identifier, wherein $N_{AP}$ indicates a number of the antenna ports, wherein $n_{SRS}^{eff}$ indicates an effective cyclic index, wherein $n_{SRS}^{cs,i}$ indicates a resulting parameter used to configure the cyclic shift for the antenna port i, wherein $n_{s,f}^\mu$ indicates a slot number of a radio frame, wherein l indicates an OFDM symbol index of the SRS transmission, wherein l' indicates an OFDM symbol index of the slot that corresponds to a first OFDM symbol of a SRS transmission in a slot given.

Moreover, an apparatus for receiving a reference signal of a wireless communication system is provided.

The apparatus for receiving is to receive a reference signal from another apparatus on a common set of resource elements, the common set of resource elements being used by the other apparatus and one or more further apparatuses in the wireless communication system, so that the reference signal from the other apparatus and one or more further reference signals from the one or more further apparatuses use the same resource elements. The reference signal from the other apparatus depends on a base sequence or a sequence derived from the base sequence and depending on a set of configuration parameters.

The apparatus for receiving is to differentiate the reference signals transmitted from a plurality of other apparatuses, which comprises the other apparatus, and the one or more further reference signals from the one or more further apparatuses by jointly analyzing a set of received symbols or by forwarding the set of received symbols to another apparatus for further processing.

In an embodiment, the set of configuration parameters may, e.g., be a set of cyclic shift parameters (shift pattern).

According to an embodiment, the reference signal from the other apparatus and the one or more further reference signals from the one or more further apparatuses comprise a sequence of OFDM symbols. The reference signal from the other apparatus and the one or more further reference signals from the one or more further apparatuses depend on different cyclic shift parameters.

In an embodiment, the apparatus for receiving may, e.g., be to apply the transmission sequence information to differentiate a plurality of antenna ports of the other apparatus and/or of the one or more further apparatuses.

According to an embodiment, the apparatus for receiving may, e.g., be to report information related to one or more measurements performed on the reference signal to the other apparatus for further processing.

In an embodiment, the apparatus for receiving may, e.g., perform measurements and reports the measurements to another apparatus,
wherein the reports may, e.g., include at least one or more of the measurements:
  a set of ToA values
  a set of AoA values
  a set of AoD values
  a set of RSRP values,
wherein the report may, e.g., include at least one of the following complementary data:
  an identifier for the RS related to each measurement value,
  a timestamp of the measurement.

According to an embodiment, the apparatus for receiving may, e.g., be to receive the set of cyclic shift parameters from a network node of the wireless communication system.

In an embodiment, to receive said reference signal from said other apparatus, the apparatus for receiving may, e.g., be to find one or more peaks or one or more paths using a channel impulse response, and the apparatus for receiving may, e.g., be to map the one or more peaks or the one or more paths found to one or more peaks found in previously received symbols.

According to an embodiment, the apparatus for receiving may, e.g., be to find the one or more peaks or the one or more paths using the channel impulse response in a current slot, and wherein the apparatus for receiving may, e.g., be to map the one or more peaks or the one or more paths found to one or more previously found peaks of one or more previous slots.

In an embodiment, the apparatus for receiving may, e.g., be to continuously update information for delay and amplitude for each peak to keep for the prediction of the next occurrence of a peak.

According to an embodiment, the apparatus may, e.g., be to predict the positioning of the next occurrence of a peak using the information from previously received symbols.

In an embodiment, the apparatus may, e.g., be to store information on the one or more peaks or the one or more paths found in the current slot that provides information on at least one of:
  an amplitude,
  a delay,
  a phase,
  a delay-drift,
  a phase-drift,
  peak appearance statistics or path appearance statistics.

According to an embodiment, the apparatus may, e.g., be to map the one or more peaks or the one or more paths found in the current slot to one or more previously found peaks in one or more previous slot by calculating one or more expected delays for the current slot, and by mapping measured peaks to peaks stored in a memory of the apparatus.

In an embodiment, if one of the one or more founds peaks was found in the memory, the apparatus may, e.g., be to increase a peak appearance statistics or a path appearance statistics. If one of the one or more founds peaks was not found in the memory, the apparatus may, e.g., be to add a new peak in the memory with initial value for peak appearance statistics or path appearance statistics.

According to an embodiment, if a peak was not found in the current slot but exists in the memory, the apparatus may, e.g., be to reduce the peak appearance statistics or the path appearance statistics. The apparatus may, e.g., be to eliminate a no longer active peak from the memory, if the peak appearance statistics or the path appearance statistics becomes smaller than threshold.

Furthermore, a network node of a wireless communication system is provided.

The network node is to provide information on a set of configuration parameters to another apparatus of the wireless communication system.

The other apparatus is to transmit a reference signal on a common set of resource elements, the common set of resource elements being used by one or more further apparatuses in the wireless communication system, so that the reference signal of the other apparatus and one or more further reference signals of the one or more further apparatuses use the same resource elements.

Furthermore, the other apparatus is to transmit the reference signal depending on a base sequence or a sequence derived from the base sequence and depending on the set of configuration parameters provided by the network node.

According to an embodiment, the set of configuration parameters may, e.g., be a set of cyclic shift parameters (shift pattern).

In an embodiment, the network node may, e.g., be to receive the configuration parameters from another network node.

According to an embodiment, the other network node implements a location management function or may, e.g., be a location management server.

In an embodiment, the network node may, e.g., be to provide the other apparatus with the configuration information comprising configuration information for the reference signal, and may, e.g., be to request the other apparatus to perform measurements.

Moreover, a network node for a wireless communication system is provided.

The network node is to receive a message from an apparatus comprising information on a reference signal transmitted from another apparatus on a common set of resource elements, the common set of resource elements being used by a plurality of antenna ports of the other apparatus and/or one or more further apparatuses in the wireless communication system, so that the reference signal from the other apparatus and one or more further reference signals from the one or more further apparatuses use the same resource elements.

The message comprises information relating to one or more additional paths found in the current slot which are associated with one or more previously found paths in one or more previous measurement.

The network node is to apply transmission sequence information to differentiate the plurality of antenna ports of the other apparatus and/or one or more further apparatuses.

Furthermore, a wireless communication system is provided.

The wireless communication system comprises at least two apparatuses as described above which are to transmit a reference signal, and at least one apparatus which is to receive a reference signal.

The apparatus which is to receive the reference signal is to receive a reference signal from at least one of the at least two apparatuses which are to transmit the reference signal.

According to an embodiment, each of the at least two apparatuses which are to transmit the reference signal may, e.g., have a set of cyclic shift parameters that is different from the set of cyclic shift parameters of any other apparatus of the at least two apparatuses which are to transmit the reference signal.

In an embodiment, the wireless communication system may, e.g., comprise another apparatus, wherein each of the at least two apparatuses which are to transmit the reference signal may, e.g., be configured to receive its set of cyclic shift parameters from said other apparatus. For example, said other apparatus may, e.g., be configured to transmit, to each of the at least two apparatuses which are to transmit the reference signal, an individual set of cyclic shift parameters for said apparatus which is to transmit the reference signal.

According to another embodiment, the wireless communication system further comprises a network node according to one of the above-described embodiments.

Embodiments focus on scenarios where the link budget is not critical (e.g. indoor scenarios) or a high update rate of the position measurements is needed (e.g. fast moving devices). Furthermore, the application avoids the drawbacks of the solutions given above.

Embodiments are based on the following concepts:

A periodic or semi-persistent SRS (or other uplink positioning sequence) transmission is assumed.

Several UEs and/or different antenna ports of a UE share the same resource elements (REs). All transmit signals sharing the same REs use the same base sequence, but different cyclic shifts.

The ToA of the signals depends on the transmit time offset (timing advance=TA) relative to a received downlink signal and the distance. Typically, the TA is set that the signal arrives at least at one reception point (RP) synchronized to a common framing (nominal timing). But if several RPs are considered, the TA can be adjusted for one RP only. All other RPs receive the signal with an offset relative to the nominal timing.

Together with the first arriving signals=first arriving path (FAP) many multipath components may be received. The FAP is either the line-of-sight (LOS) signal (for LOS receive conditions) or the first arriving multipath component. The characteristics of the channel impulse response (CIR) can be described by the delay spread and the excess delay. The excess delay is the delay difference between the delay of the LOS path and the signal with the highest delay.

The CIRs of the signals from different UEs may overlap, if the maximum excess delay and the time offset resulting from non ideal setting of the TA and distance difference between UE ⇔ s-gNB and UE ⇔ n-gNBs (s-gNB=gNB used for adjustment of the TA, n-gNBs=other gNBs) exceeds the cyclic shift value.

The cyclic shift value (in seconds) depends on the OFDM symbol duration, the COMB factor and the cyclic shift index itself. The distance $d\tau$ between the correlation peaks of two sequences using different cyclic shifts can be calculated by $$d\tau = \frac{1}{SCS} \cdot \frac{1}{K_{TC}} \cdot \left( \frac{n_{SRS,}^{cs,UEj}}{n_{SRS}^{cs,max}} - \frac{n_{SRS}^{cs,UEi}}{n_{SRS}^{cs,max}} \right)$$

$$d\tau = \frac{1}{SCS} \cdot \frac{1}{K_{TC}} \cdot \left( \frac{n_{SRS}^{cs,UEj}}{n_{SRS}^{cs,max}} - \frac{n_{SRS}^{cs,UEi}}{n_{SRS}^{cs,max}} \right)$$

$$d\tau = \frac{1}{SCS} \cdot \frac{1}{K_{TC}} \cdot \left( \frac{n_{SRS,}^{cs,UEj}}{n_{SRS}^{cs,max}} - \frac{n_{SRS}^{cs,UEi}}{n_{SRS}^{cs,max}} \right)$$

with $K_{TC} n_{SRS}^{cs} n_{SRS}^{cs,max} n_{SRS,}^{cs,UEj} n_{SRS,}^{cs,UEi} n_{SRS}^{cs,max} K_{TC}$ SCS=sub carrier spacking (30 kHz, for example)

$K_{TC} n_{SRS}^{cs} n_{SRS}^{cs,max} n_{SRS,}^{cs,UEj} n_{SRS,}^{cs,UEi}$
$n_{SRS}^{cs,max} K_{TC}$=COMB factor (supported values are [2,4,8]

$K_{TC} n_{SRS}^{cs} n_{SRS}^{cs,max} n_{SRS,}^{cs,UEj} n_{SRS,}^{cs,UEi}$
$n_{SRS}^{cs,max} K_{TC}$=cyclic shift index ([0 . . . ] are allowed for release 16

$K_{TC} n_{SRS}^{cs} n_{SRS}^{cs,max} n_{SRS,}^{cs,UEj} n_{SRS,}^{cs,UEi} n_{SRS}^{cs,max} K_{TC}$
and are selected values for UE j and UE i $K_{TC} n_{SRS}^{cs} n_{SRS}^{cs,max} n_{SRS,}^{cs,UEj} n_{SRS,}^{cs,UEi}$
$n_{SRS}^{cs,max} K_{TC}$=cyclic shift steps, for release 16 this depends on and is 8, 12 or b 6

EXAMPLE $$n_{SRS}{}^{cs,UEj} n_{SRS}{}^{cs,UEi} K_{TC}=4 d\tau=1, =0, SCS= 30 \text{ kHz}, \rightarrow =694$$

$$n_{SRS}{}^{cs,UEj} n_{SRS}{}^{cs,UEi} K_{TC}=4 \, d\tau$$

(For InF (industrial factory) excess delays in the range of 1000 ns or more are expected, for other scenarios the excess delays may be higher or lower)

As reference scenario the following scenario is selected:

The UEs sharing the same REs use the same Zadoff-Chu sequence (or another transmit sequence with "zero auto-correlation properties", e.g. CAZAC sequences), but with different cyclic shifts. As long the channel impulse response does not overlap, the signals can be separated even if the level difference is very high. Compared to this code multiplex using different sequences instead of cyclic shift allow a limited signal level difference only due to the non-ideal cross correlation properties.

A high COMB factor $K_{TC}$ may be used to minimize the number of REs allocated to one UE. It is known that the "power boosting gain" compensates the loss resulting from the reduction of the number of REs. Hence, an SRS with $K_{TC}=8$ will provide the same performance as a SRS with $K_{TC}=4$ or 2 at least for wideband signals (=Sequence length=number of used subcarrier is sufficient. Example: 50 MHz bandwidth, SCS=30 kHz, $K_{TC}=8$ the sequence length is >200) →Especially for indoor scenario $K_{TC}=8$ or 4 may be useful. This allows that already 8 (or 4) UEs can be distinguished in the frequency domain. For editorial reasons the figures in this document use $K_{TC}=4$.

The standard allows to combine SRS transmissions with staggering. This is especially useful in case of high distance. In this case the transmit power may be not sufficient. By using several symbols overall transmitted energy per SRS symbol is higher and correlation techniques allow to operate at very low signal-to-noise ratios (SNR). For indoor scenarios staggering is typically not needed, because for distances considered for InF (Indoor Factory) scenarios the transmit power of the UE may be sufficient for the needed signal-to-noise ratio (SNR). Staggering may be needed only for low power devices supporting a lower TX power.

The resulting correlator output is depicted in FIG. 1 for 4 UEs.

In particular, FIG. 1 illustrates characteristics of the correlator output if 4 UEs with different cyclic shifts share the same OFDM symbol.

Each color represents the correlator output related to different UE. The correlator output represents the measured CIR (channel impulse response). The first peak results from the signal related to LOS reception. The "triangle" represents the components resulting from multipath propagation. If the delay spread is low and the transmit timing is correct the CIR will not overlap (yellow, green, red). If the delay spread is high (blue) the CIR may overlap with the next UE. This overlap is not critical if all UEs arrive with similar signal level and the first arriving path (FAP) is strong compared to the remaining multipath components.

The main challenge of Time-of-arrival (ToA) based positioning technologies is the detection of the first arriving path (FAP). If the FAP is not the strongest signal or in the time window where the FAP is expected, correlation peaks resulting from other UEs are detected, it may be difficult to detect the FAP.

FIG. 2 illustrates an example for a critical overlap of the CIRs.

Within the expected time window for the FAP signals from the wanted UE (yellow) and multipath components from another UE (blue) arrive. In this case it is difficult to identify the FAP related to the "yellow" UE Assuming a periodic or semi-persistent allocation of the SRS (or an aperiodic configuration for a UE with more than one SRS resource) is selected to provide a regular update of the position or for averaging over several SRS transmissions in case of strong interference or very low SNR the allocation of the cyclic shift values can be randomize ensuring that for each slot different CIRs may overlap. An example for a cyclic shift pattern for an example with 4 UEs sharing the same REs is provided in Table 1.

In particular, Table 1 provides an example for cyclic shift pattern (all values have to be multiplied with the CS-stepsize):

TABLE 1

|            | UE1 | UE2 | UE3 | UE4 |
|------------|-----|-----|-----|-----|
| Slot n     | 0   | 1   | 2   | 3   |
| Slot n + 1 | 1   | 3   | 0   | 2   |
| Slot n + 2 | 2   | 0   | 3   | 1   |
| Slot n + 3 | 3   | 2   | 1   | 0   |
| Slot n + 4 | 0   | 1   | 2   | 3   |
| ...        |     |     |     |     |

The resulting correlator outputs are depicted in FIG. 3. In particular, FIG. 3 illustrates an example for cyclic shift hopping over 4 slots according to an embodiment.

In an embodiment, the hopping pattern and/or the sequence for each transmitter may, e.g., be periodically repeated.

The above concepts allow that, in slots with overlap of the CIR the measurements can be ignored. Moreover, the signals of several slots are combined to assist a "peak-tracker". The peak-tracker identifies the peak related to the wanted UE.

In the following, a detailed description of particular embodiments is provided.

For example, in an exemplifying scenario, an OFDM symbol uses M subcarrier. Each subcarrier represents one resource element (RE).

5G standard allows that several SRS resources from different UEs or different ports from the same UE to share one OFDM symbol to minimize the needed channel capacity. The UEs are separated by Frequency multiplex ("COMB structure")

Code multiplex)

Different cyclic shifts (similar to code multiplex, but different cross-correlation properties)

The COMB structure allows an orthogonal assignment of the REs to different UEs. To further increase the number of UEs sharing the same OFDM symbol.

Figure 4A:
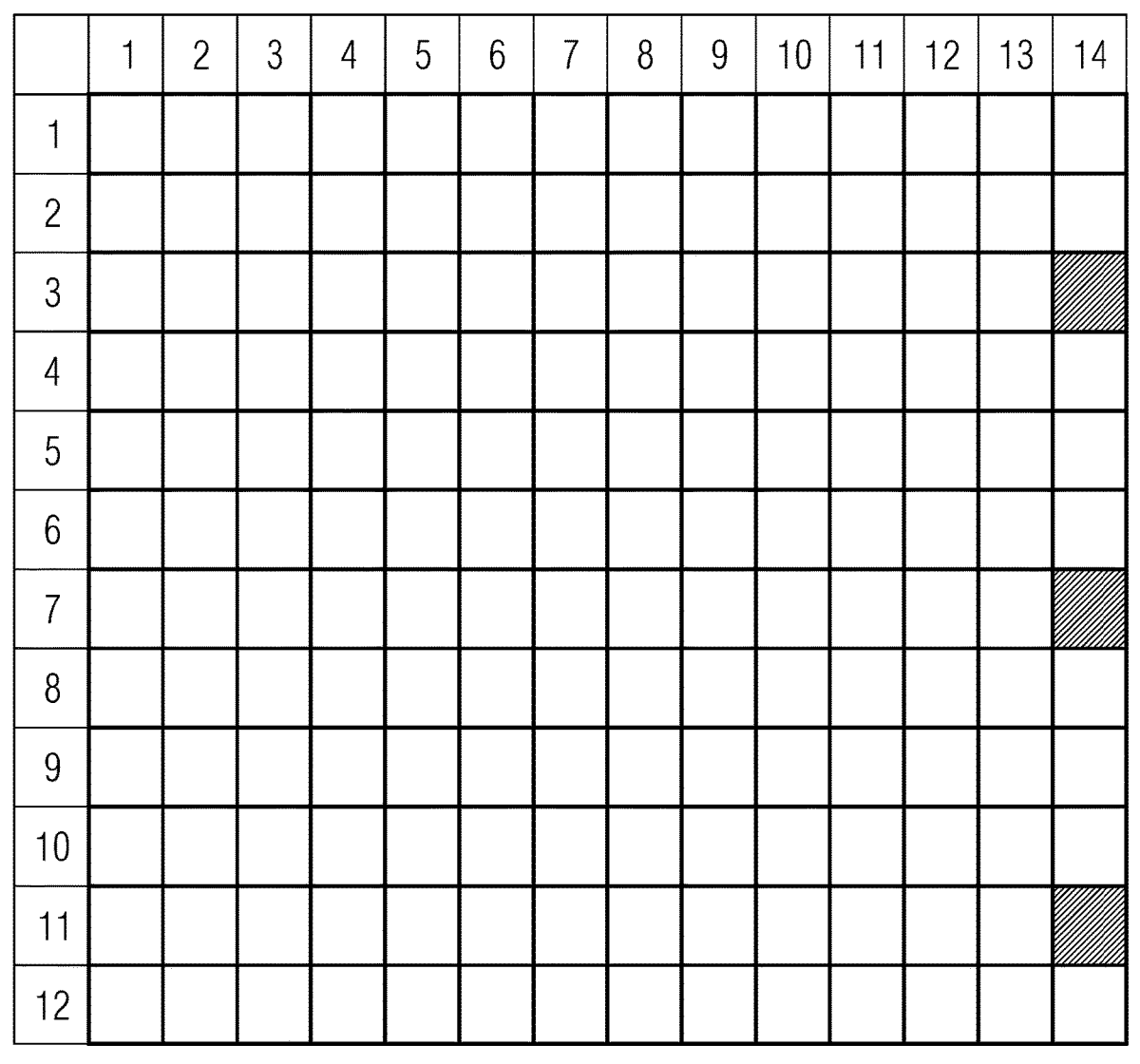

FIG. 4a illustrates a single SRS resource with parameter $K_{TC}=4$ (COMB Factor)→3 RE per RB (resource block), nbSymb=1 (number of symbols used for SRS).

Figure 4B:
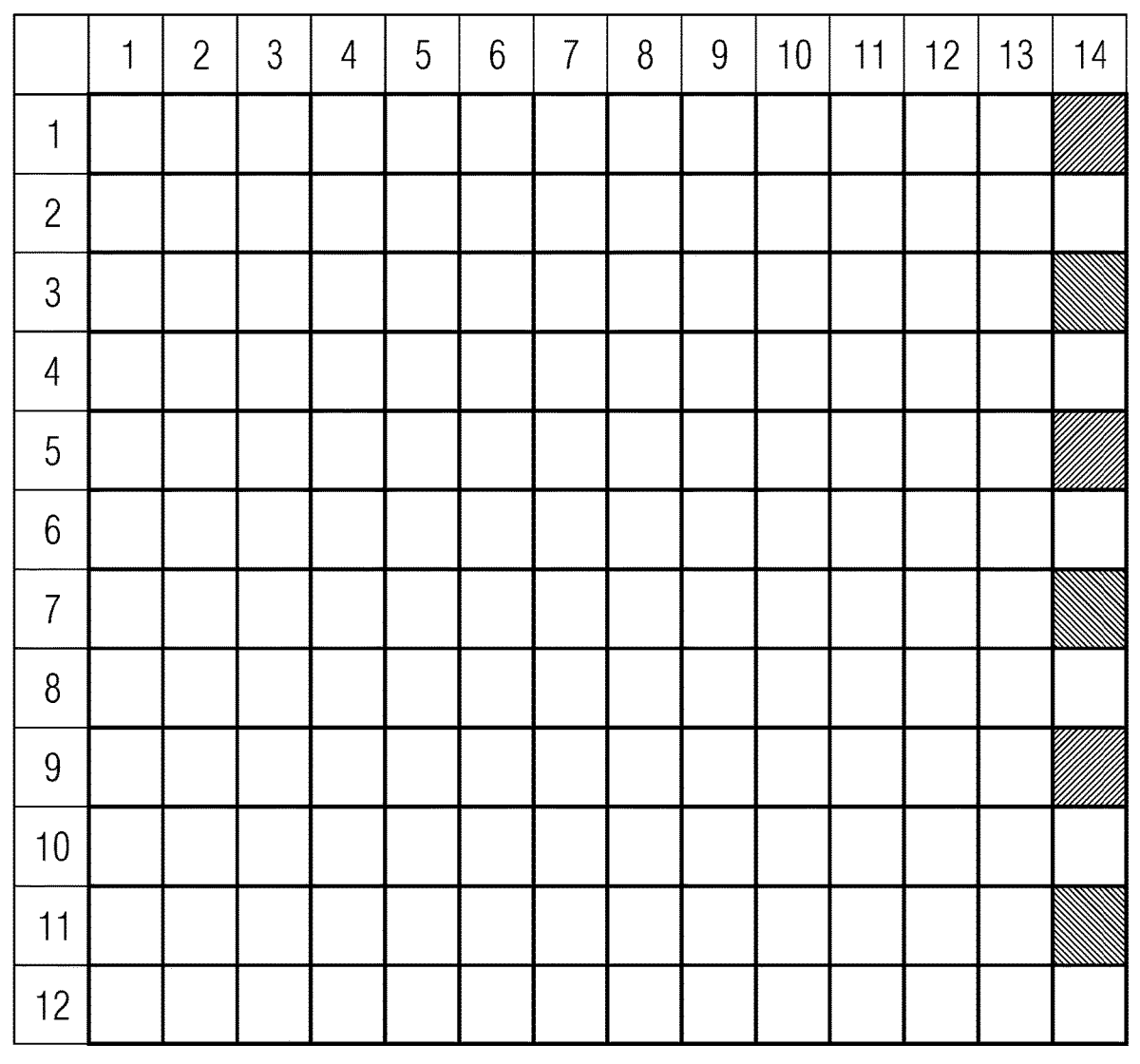

FIG. 4b illustrates frequency multiplex of two SRS resources In Rel. 16 this is not supported for positioning. The resources use different COMB offsets.

Figure 4C:
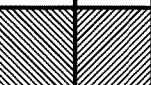
FIG. 4c illustrates time multiplex of two SRS resources, wherein the two resources use the same COMB-Offset.

FIG. 4c illustrates time multiplex of two SRS resources. The two resources use the same COM B-Offset.

Figure 4D:
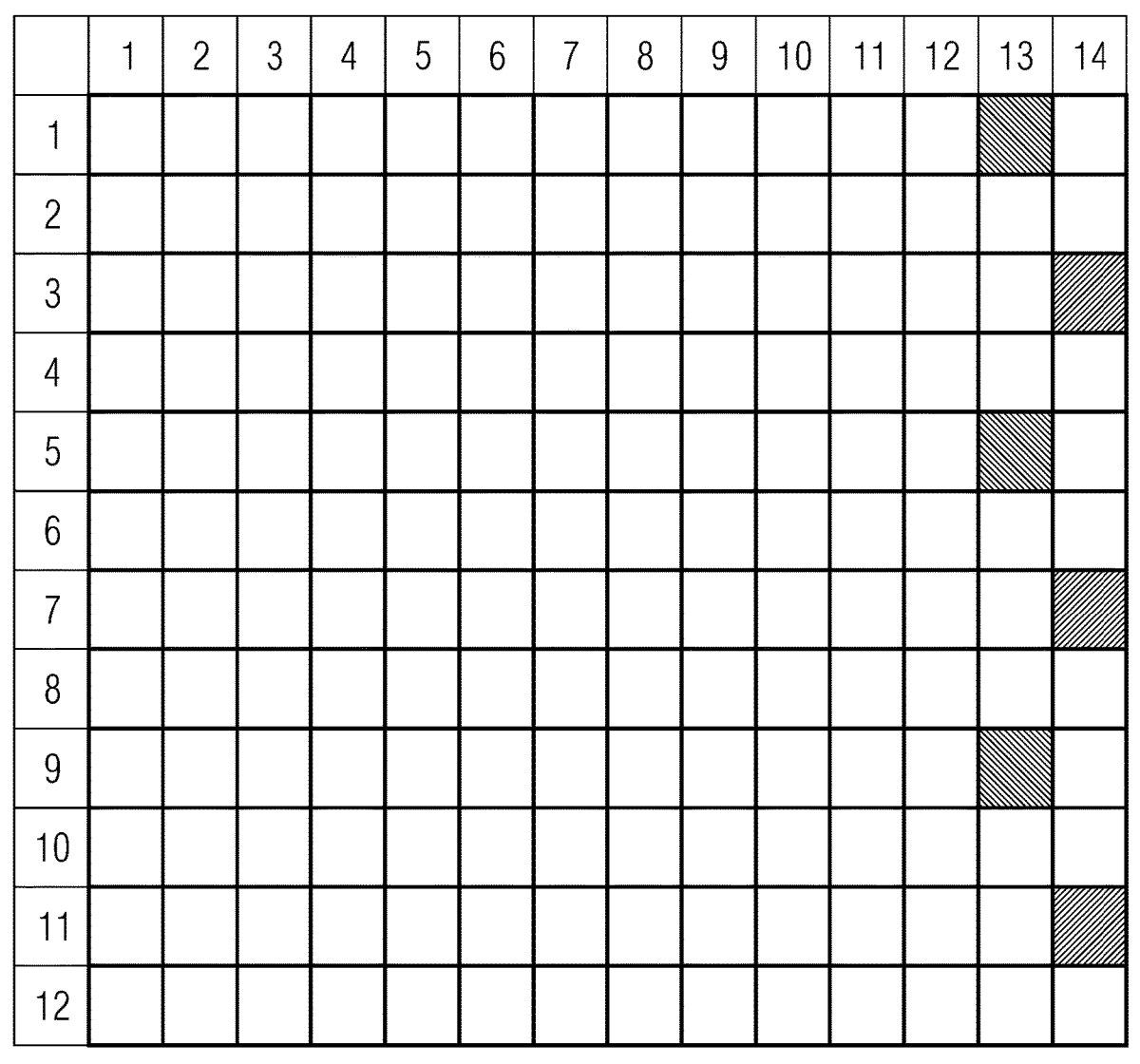

FIG. 4d illustrates Time multiplex of two SRS resources+ different COMB-Offset. If the SRS resources received phase coherent, the symbols can be combined resulting in a symbol with lower COMB-factor. This is called "staggering/destaggering".

Figure 4E:
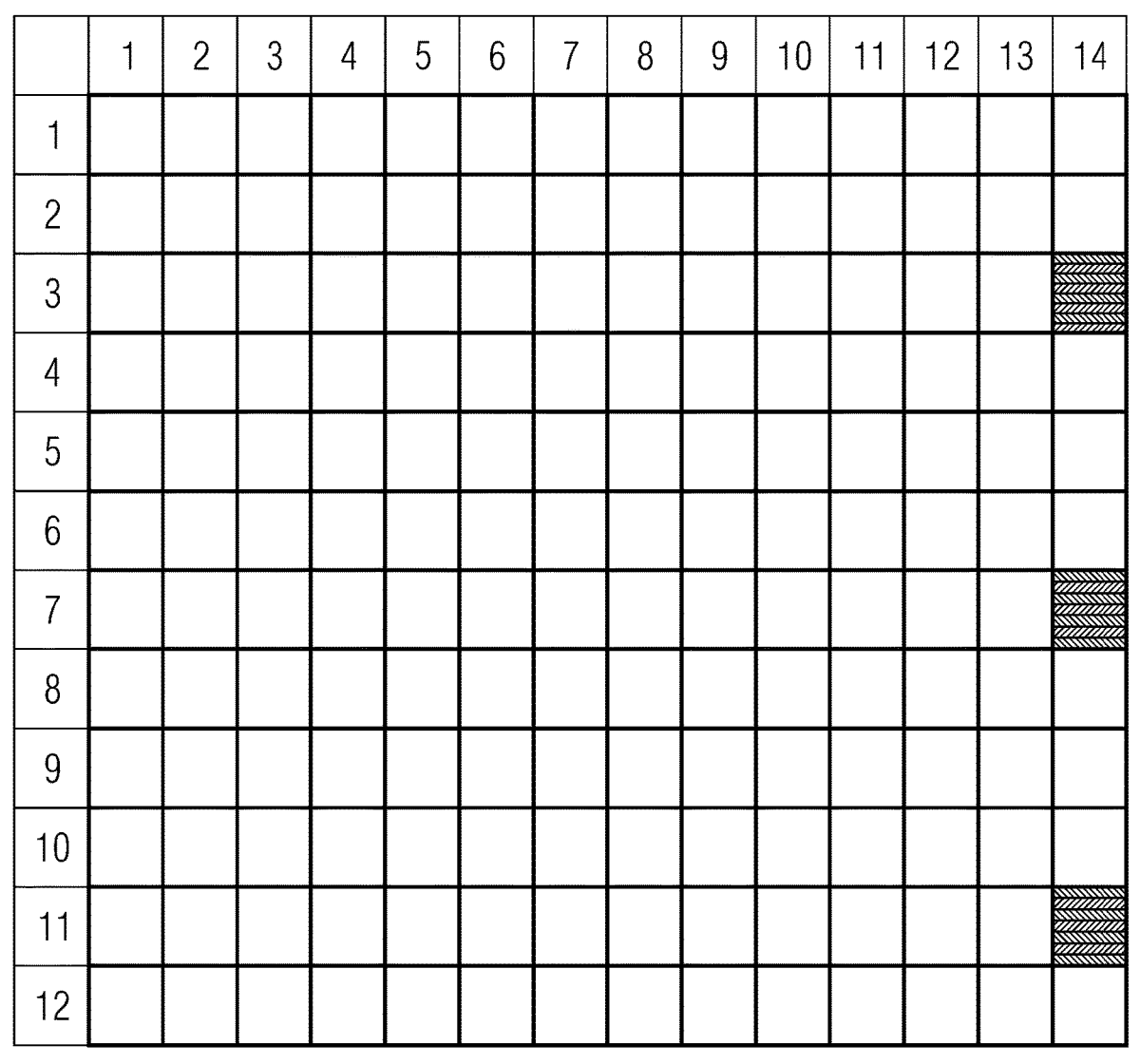

FIG. 4e illustrates Code multiplex/"cyclic shift Multiplex": The two SRS resources share the same REs.

If several UEs share the OFDM symbol "code multiplex" reduces the number of needed REs. Two types of code multiplex can be distinguished Different sequences are used.

If the time of transmit (ToT) can be synchronized to the DL it is possible to distinguish the signals by applying different "cyclic shifts" to the transmit signal.

Figure 5:
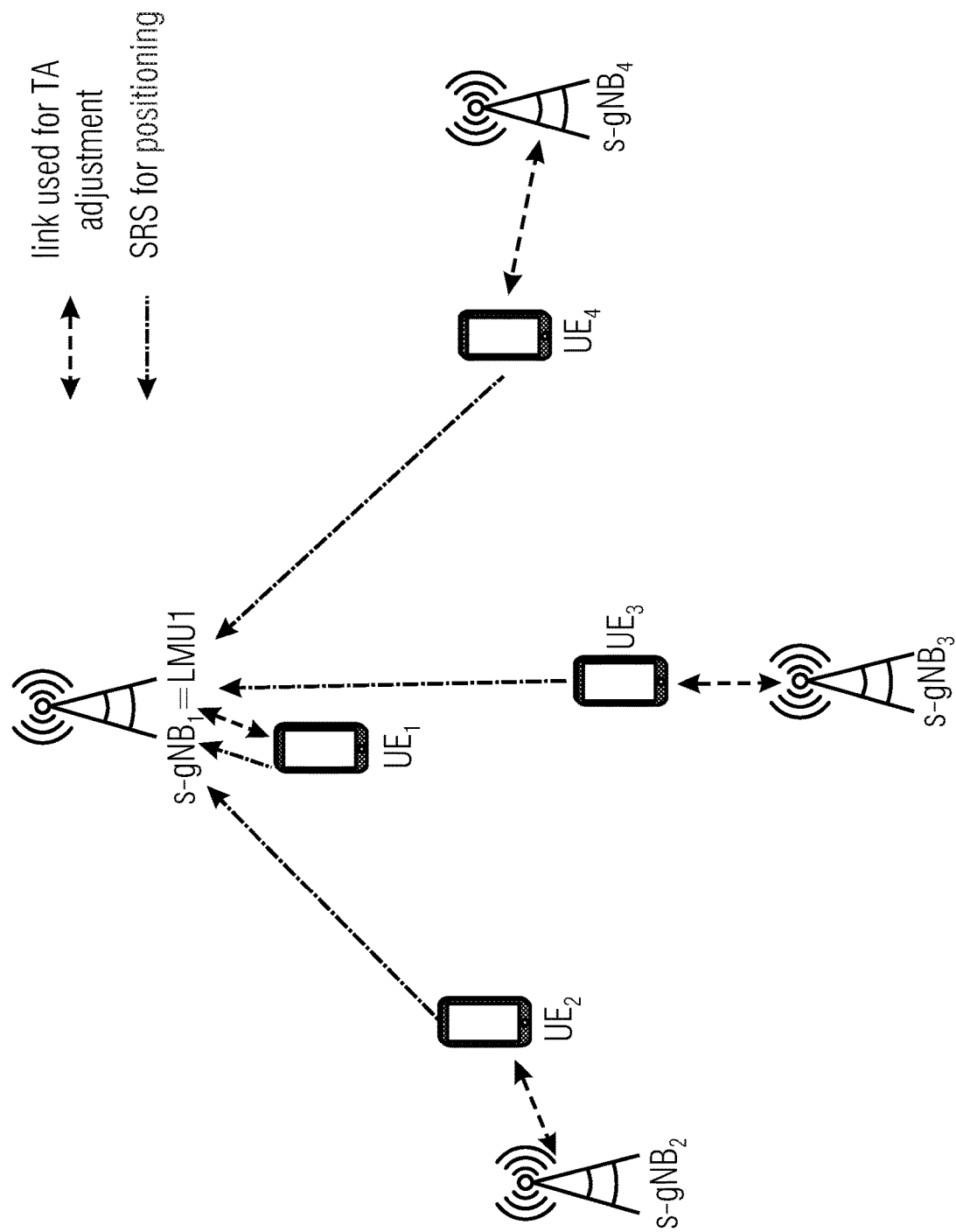
FIG. 5 illustrates an exemplifying scenario with 4 UEs, wherein each UE is served by a different s-gNB.

FIG. 5 illustrates an exemplifying scenario with 4 UEs, wherein each UE is served by a different s-gNB; whereby each UE is configured by its serving gNB for TA and power configuration. For the analysis we consider the signal at the input of one gNB (LMU1 in the figure).

Figure 6:
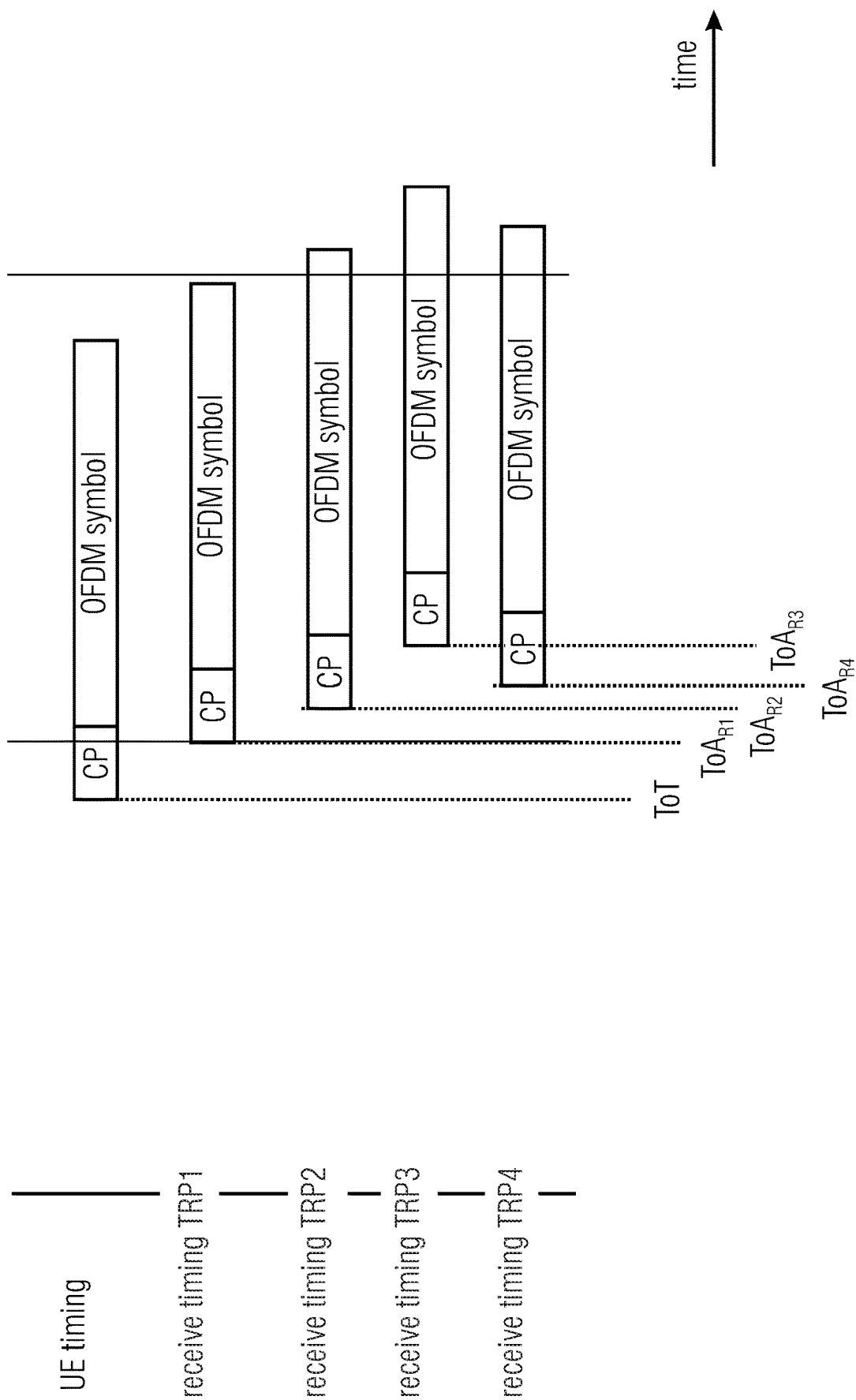
FIG. 6 depicts transmit and receive timing for one UE and different receive TRP.

FIG. 6 depicts transmit and receive timing for one UE and different receive TRP. In particular, FIG. 6 depicts the time-of-arrival (ToA) of the signal emitted by one UE at the input of different TRP. Assuming the receiving TRPs are synchronized the ToA can be measured at each TRP in relationship to a common reference. The difference of the ToA (TDOA=Time difference of arrival) represents the position. For TDOA based positioning algorithms it is not needed to know the time-of-transmit (ToT) and it is not necessary to synchronize the transmitter.

But for communication systems assuming bi-directional communication the ToT of the UE can be derived from the downlink signal of the gNBs. In standards like LTE or 5G-NR the transmit time is adjusted to ensure that the uplink signal (UL) arrives at the TRP with a framing synchronized to the downlink framing (DL). Typically, the UL timing is adjusted by the serving-gNB (s-gNB).

It may be assumed that all gNBs are synchronized to a common reference each UE may use a different gNB as "serving gNB" (s-gNB)

Each UE transmits the signal with a "timing advance" (TA). This is adjusted according to the distance of the UE to the related s-gNB. This means, the ToT (time of transmit) is set in relationship to a received DL synchronization signal with an offset according the distance. This ensures that the signals arrive synchronized to the DL framing at the s-gNB.

All other gNBs receive the signal with a delay-offset according to the distance difference.

This concept ensures that the signal of all UEs arrive within a given time frame. An example for this concept is depicted in FIG. 7.

Figure 7:
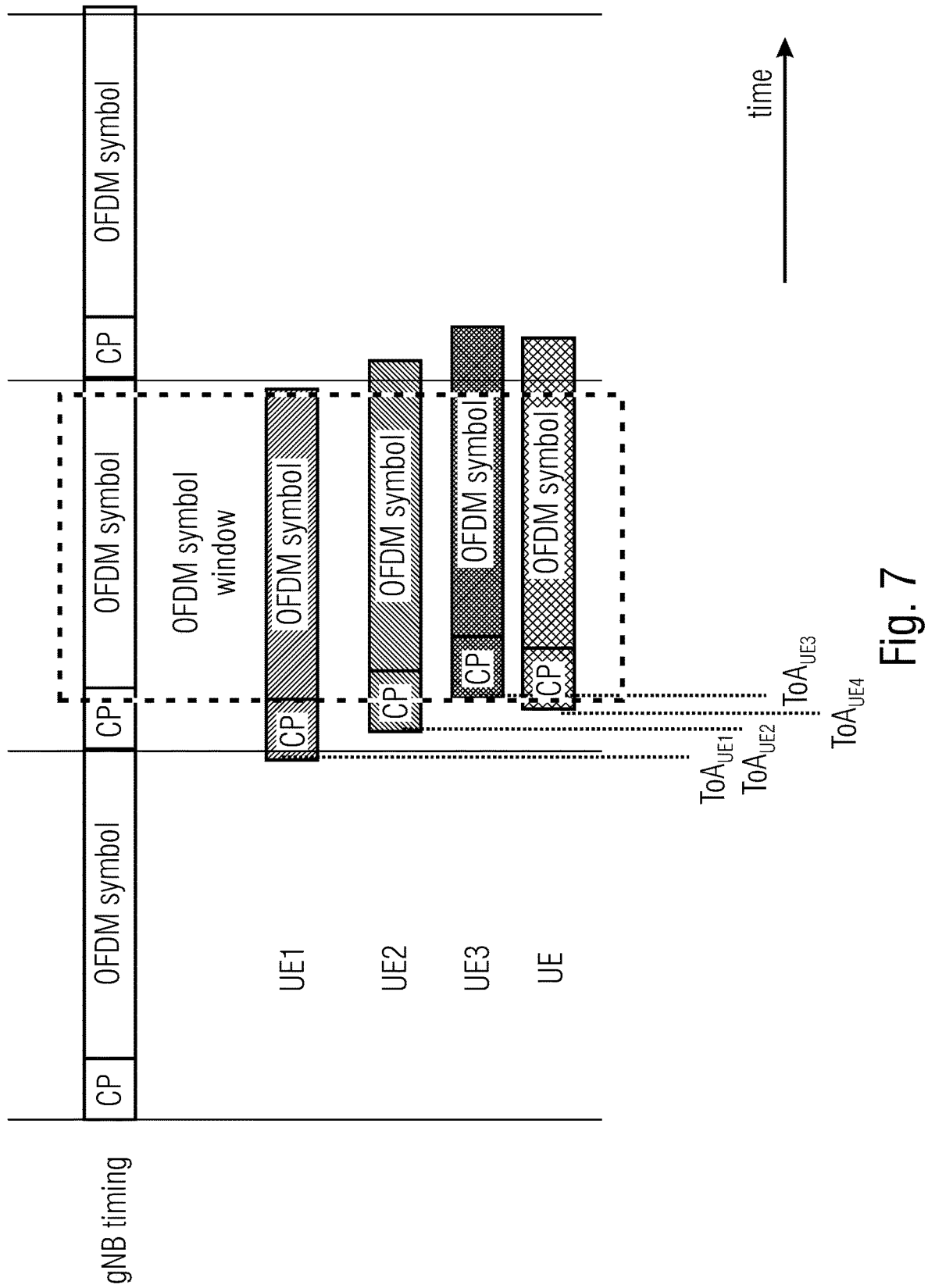
FIG. 7 illustrates a ToA relationship at input of one TRP for different UEs.

In particular, FIG. 7 illustrates a ToA relationship at input of one TRP for different UEs.

According to an embodiment, Constant Amplitude Zero Auto-Correlation (CAZAC) sequences is employed in combination with OFDM modulation and cyclic shift.

OFDM with cyclic prefix (CP) allows a very efficient implementation of the "cyclic correlation". The cyclic correlation can be implemented in an efficient way by the FFT and may, e.g., be realized by:

The samples within a time window with a length equivalent to the length of the OFDM symbol without CP may, e.g. be used (see FIG. 7).

If the signals from different UEs arrive within a time offset according to the CP length, the sub-carriers may, e.g., remain orthogonal. This allows that neighboring sub-carriers can be allocated to other UEs ("COMB structure") and can be separated in the frequency domain even if the signals arrive with high level difference.

In case of significant Doppler spreads, or if the signals arrive outside the time window, some intercarrier interference (ICI) may result. To minimize the ICI for high carrier frequencies and/or high Doppler frequencies (high vehicle speed) and/or non-ideal frequency offset estimation a higher sub carrier spacing may, e.g., be advantageous for high carrier frequencies. But this reduces the allowed delay spread.

Cyclic correlation may, e.g., be combined with cyclic shifts.

Figure 8:
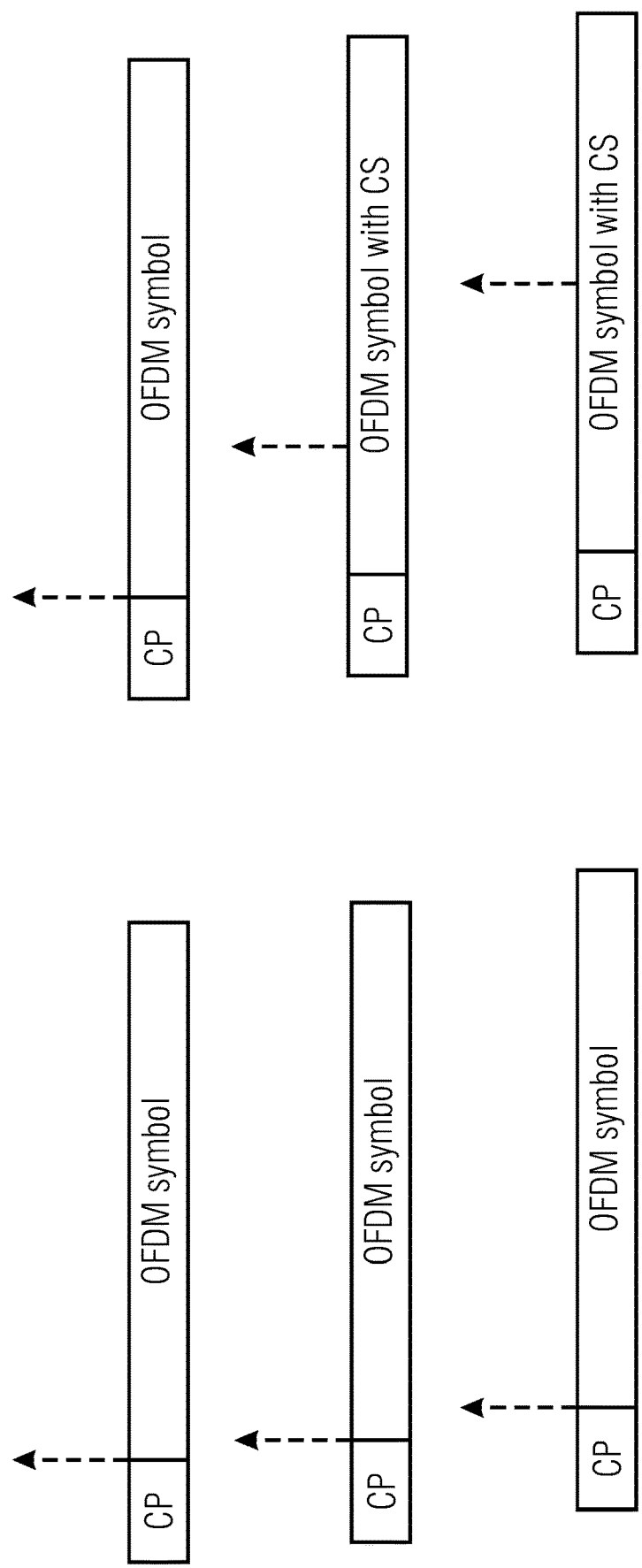
FIGS. 8a, 8b depict an effective correlation peak representing the time of arrival measurements, in FIG. 8a without and in FIG. 8b, according to an embodiment, with cyclic shift.

The properties of the signal at the output of the correlator without and with cyclic shifts are depicted in FIG. 8a and FIG. 8b. In particular, FIG. 8a and FIG. 8b depict an effective time of arrival, in FIG. 8a without and in FIG. 8b with cyclic shift. The red arrows indicate the effective correlation peak if the received OFDM signal is correlated with the reference sequence (the base sequence, for example). Obviously, OFDM symbols arriving nearly within the same time window will provide different correlation peaks. The time interval according the OFDM symbol length can be split in several intervals ("cyclic shift steps") and if a different cyclic shift is assigned to each transmit signal the parts of the correlation functions related to different UEs can be better separated.

Embodiments allow to increase the number of cyclic shift steps allowing that more UEs share the same REs. The method allows an identification of the correlation peaks related to one UE.

Assuming a multiplex of N signals with different cyclic shifts in combination with COMB factor $K_{TC}$ the correlator output includes at least $K_{TC} \cdot N$ correlation peaks within a time interval equivalent to the OFDM symbol duration. If the resulting average distance $$\frac{t_{OFDM\_symbol}}{K_{TC} \cdot N}$$

between two correlation peaks is less than the sum of the transmit time offset resulting from non-ideal timing advance adjustments, propagation delay according to the distance and delay of multipath components an ambiguity may result. In this case it may be difficult to distinguish the first arriving path (FAP) of one UE from a signal arriving late due to multipath propagation.

The following methods are known to solve this issue

Reduce $K_{TC}$

Reduce number N of used cyclic shift steps

Increase number of OFDM symbols and combine high $K_{TC}$ with "staggering"

These methods reduce the number of UEs sharing the same OFDM symbol or increase the number of OFDM symbols needed.

In embodiment, the ambiguity assigning different cyclic shifts to the UEs is resolved, ensuring that the interference resulting from different UEs is randomized.

Figure 9:
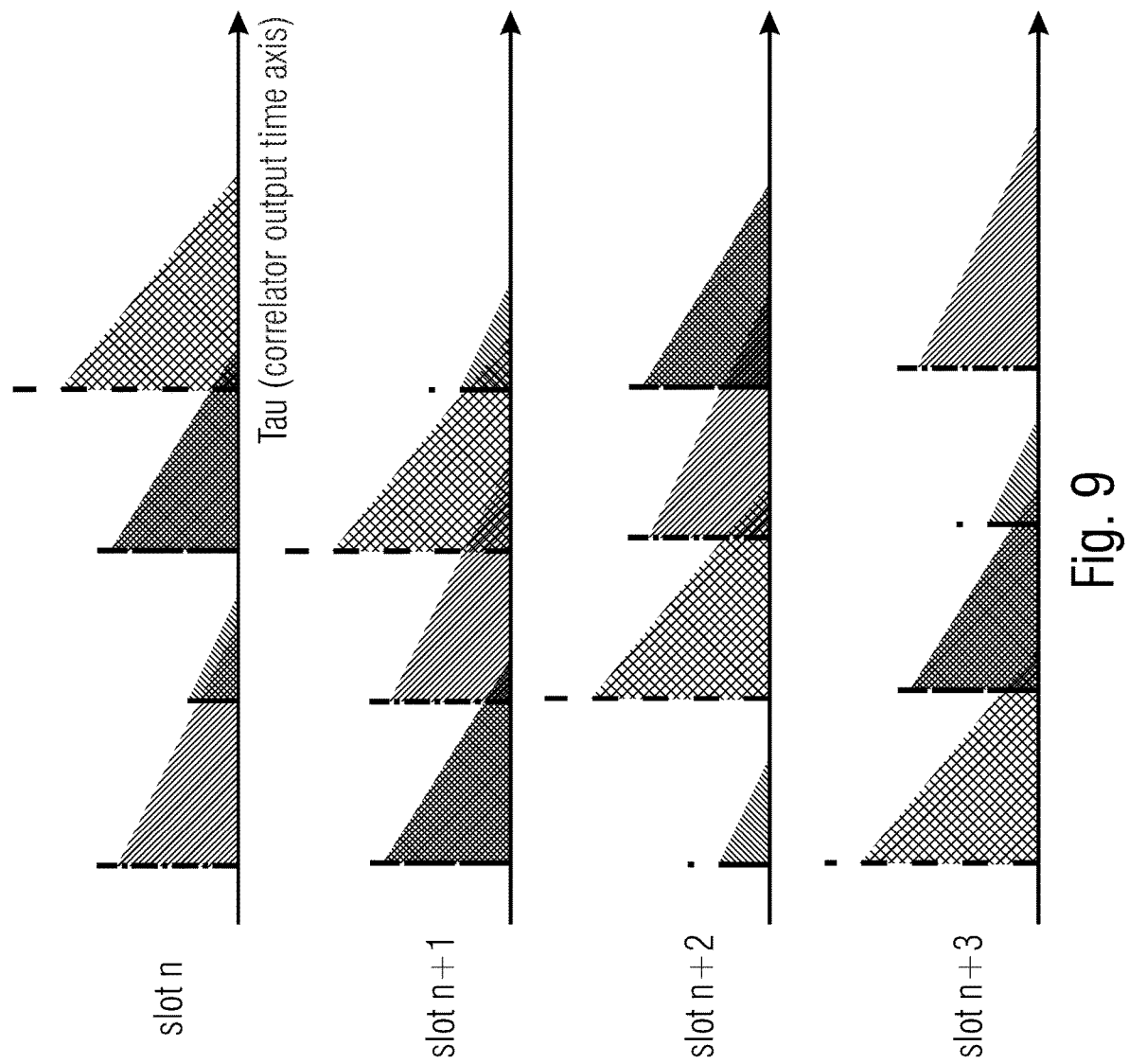
FIG. 9 depicts an example configuration and related CIRs according to an embodiment taking into account the different receive signal strength.

As an example, we consider 4 UEs separated by cyclic shifts sharing the same REs. Due to different propagation conditions (and/or different distance, antenna gains, TX-power settings, etc.) the signals of the UEs arrive with different level. In the example we take the "yellow UE" as UE arriving with low signal level FIG. 9 depicts an example configuration and related CIRs.

Figure 10:
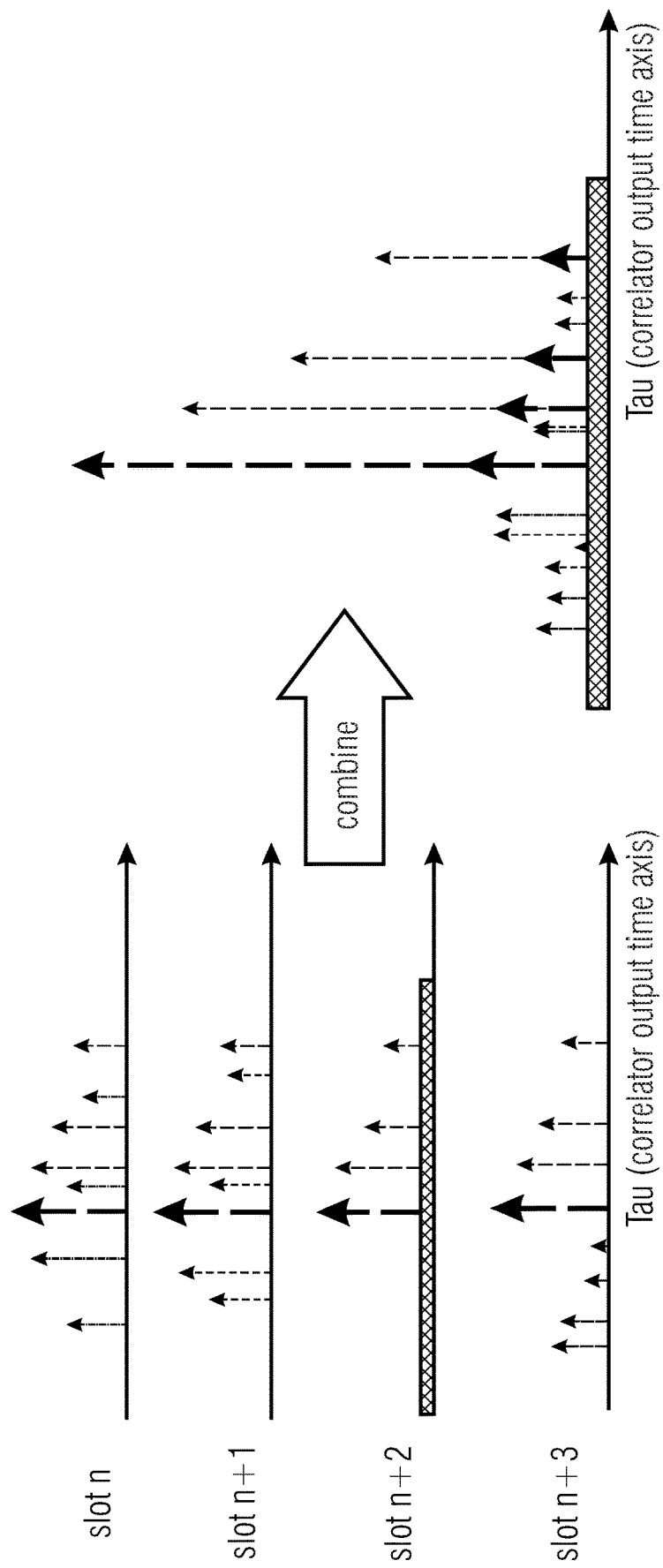

FIG. 10a and FIG. 10b depict details of received CIR for "yellow" UE: FIG. 10a depicts an individual CIR, FIG. 10b depicts a combined signal.

In particular, FIG. 10*a* and FIG. 10*b* depict the principle of the combining process. The figure shows the part of the CIR related to the expected ToA of the "yellow UE". The parts of the CIRs related to one UE can be aligned taking into account the (known) cyclic shift. If the signals are combined (e.g. the magnitude of the correlation function is added) the correlation peaks related to the yellow UE will add up, while the peaks of the other UEs stay small due to the cyclic shift hopping. Optionally the CIR parts related to one UE can be further preprocessed before combining. Possible preprocssing steps are weighting according to the signal quality
 Compensation of frequency drifts
 Phase correction to improve the combining gain by coherent combining The preprocessing may be based on one of the following information: interference level, RSRP, SNIR, change in TA or information derived from the CIR itself like the position or magnitude of the CIR peaks.

At the receiver side a so called "peak-tracker" can be implemented in the following way, to distinguish different propagation paths in the CIR between different UEs and from one UE (LOS and multipath components).

The peak-tracker may, e.g., operate in three steps:
1. Find peaks from slot n in CIR on a subsample basis
2. Mapping of found peaks to already identified ones in peak trackers memory from slot n-1
3. Update delay, amplitude (and phase) for each peak to keep track of channel variations (caused by movement of the device, changing propagation conditions and clock drifts)

Each path is stored in peak-trackers memory, for example, with these properties:
 Amplitude
 Delay
 [Phase]
 Delay-drift
 [Phase-drift]
 Peak appearance statistics For example, properties in brackets are optional (depends on CIR representation).

According to embodiments, step 2 is crucial and can be itself splitted into subtasks:
 a) Calculate expected delays for slot n (from slot n-1) in peak-trackers memory according to individual delay changes arise from the cyclic shift hopping sequence
 b) Mapping of measured peaks to peaks in peak-trackers memory:
  i. Peak was found in memory: increase peak appearance statistics
  ii. Peak can not be found in memory: add new peak to the peak tracker with initial value for peak appearance statistics
  iii. Peak was not found but exists in memory: reduce peak appearance statistics
  iv. Eliminate no longer active peak from trackers memory (when peak appearance statistics becomes smaller than threshold)

For the examples for the resource allocation concepts we assume UEs with 1 or 4 antenna ports. We compare the following configurations:

In embodiments, a high update rate is employed.

Each UE transmits within each time interval 1 SRS. The duration of a time interval (periodicity) may, e.g., be configurable. For moving devices, a high update rate (short time interval) allows a continuous tracking. For a high update rate (e.g. 10 ms) there is a minor change of the position between two SRS transmissions and the CIR may changes only slightly: The change of the delay of the correlation peak may be negligible, but the phase may change. By evaluating the magnitude of the CIR peaks related to the same UE can be identified.

Figure 11:
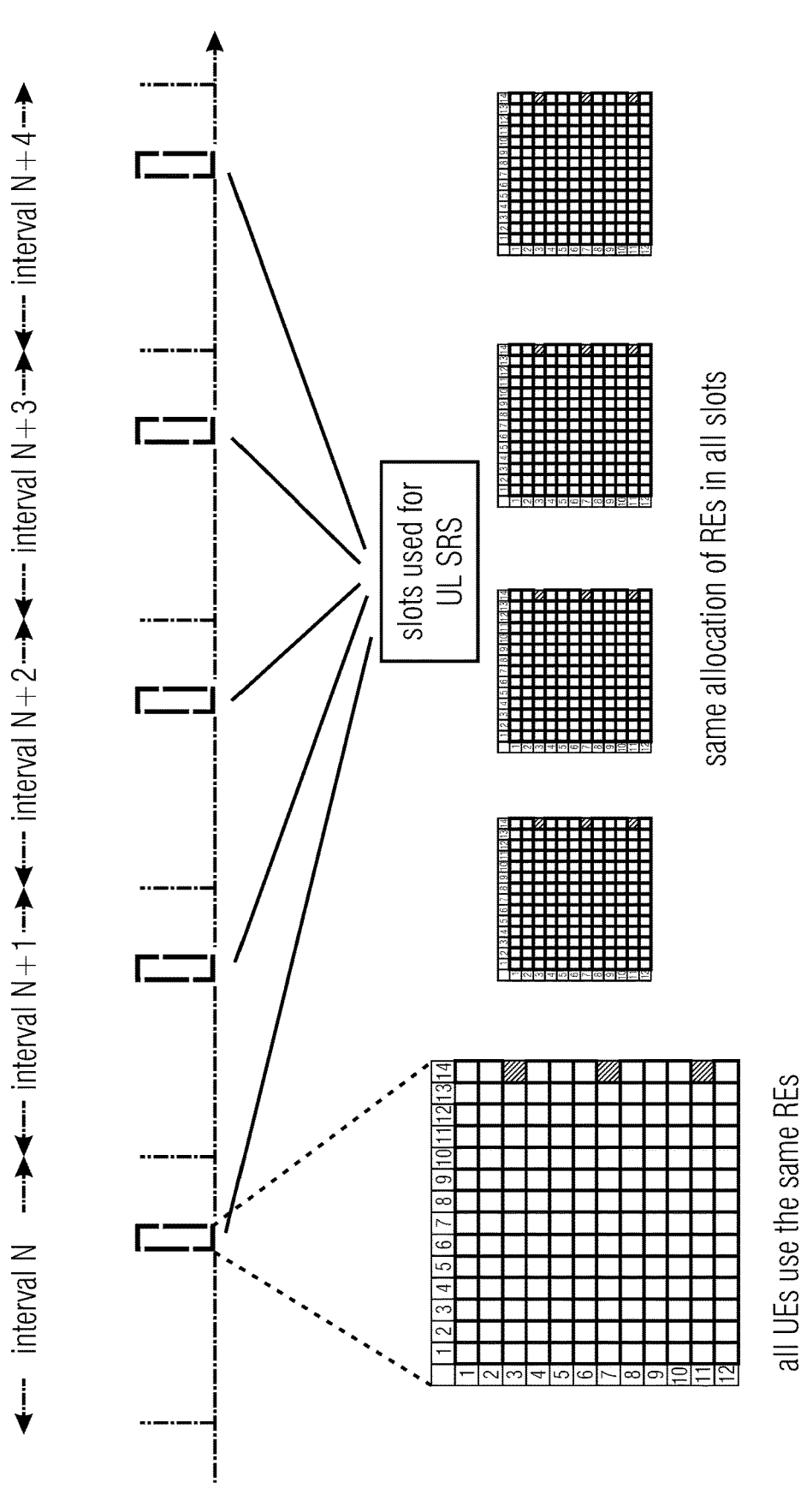
FIG. 11 illustrates a possible allocation strategy, wherein 12 UEs share the same REs according to an embodiment.

FIG. 11 illustrates a possible allocation strategy, wherein 12 UEs share the same REs.

The concept can be extended to UEs with several antennas. An antenna port represents a physical antenna or an antenna configuration (e.g. setting of the beam forming network). For positioning it is essential that the signal arrives at several base stations. The number of antenna configurations needed depends on the directivity of the antennas. In the example we use 4 antennas (2 polarisations each →4×2 antenna ports) to achieve a good 360° coverage. For the transmission we may use one polarization only (4 of the 8 antenna ports are used). We consider two types of UEs UEs with one TXRU (the number of TXRU represents the number of signals which can be transmitted in parallel, but several antenna ports. In this case antenna port switching applies. The antenna ports are activated sequentially UEs with several TXRUs. In this case several signals can be transmitted over several antenna ports in parallel.

Figure 12:
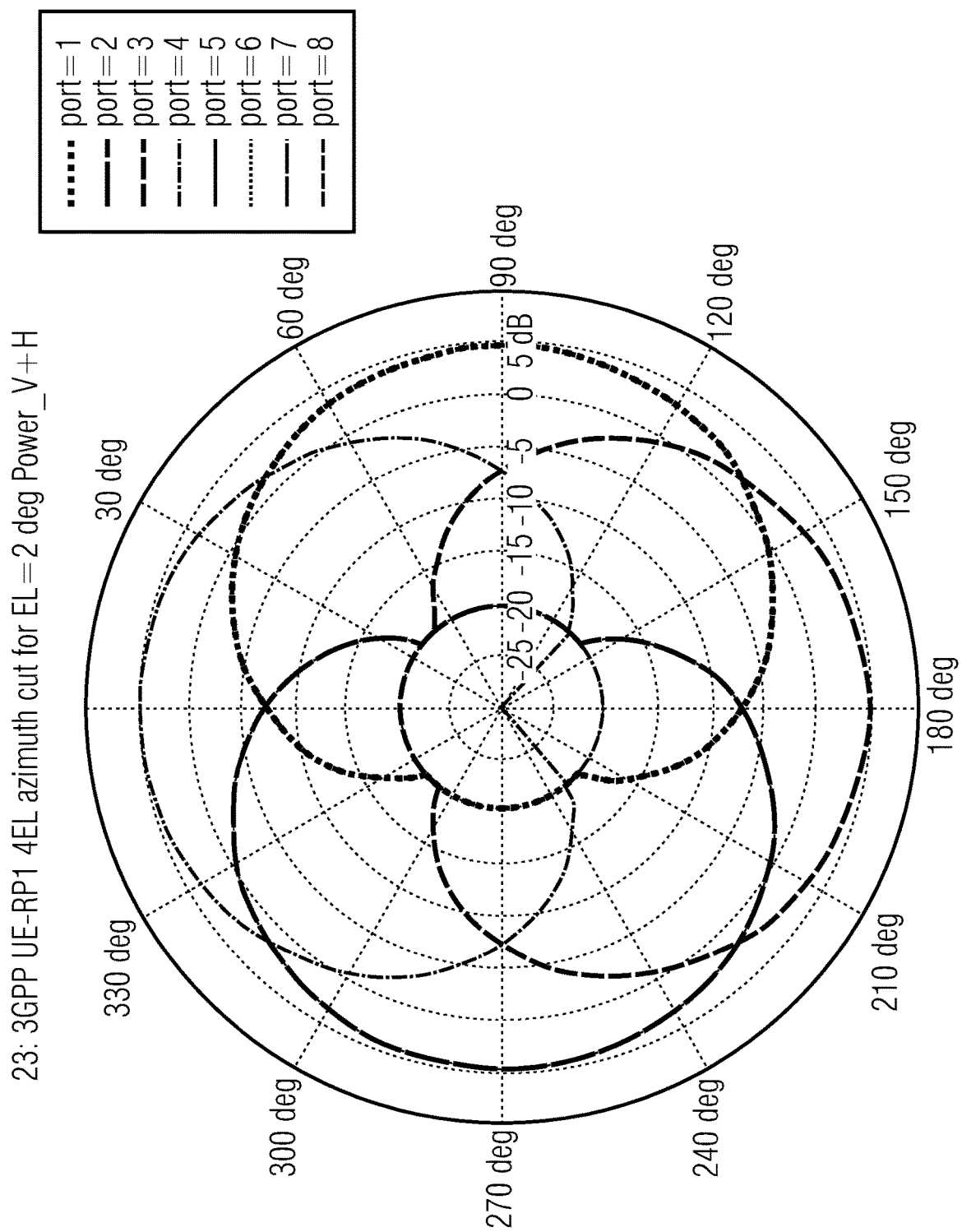
FIG. 12 illustrates an example for an antenna pattern depicting four elements with a 3GPP FR2 reference pattern according to an embodiment.

FIG. 12 illustrates an example for an antenna pattern (4 elements with a 3GPP FR2 reference pattern).

Figure 13:
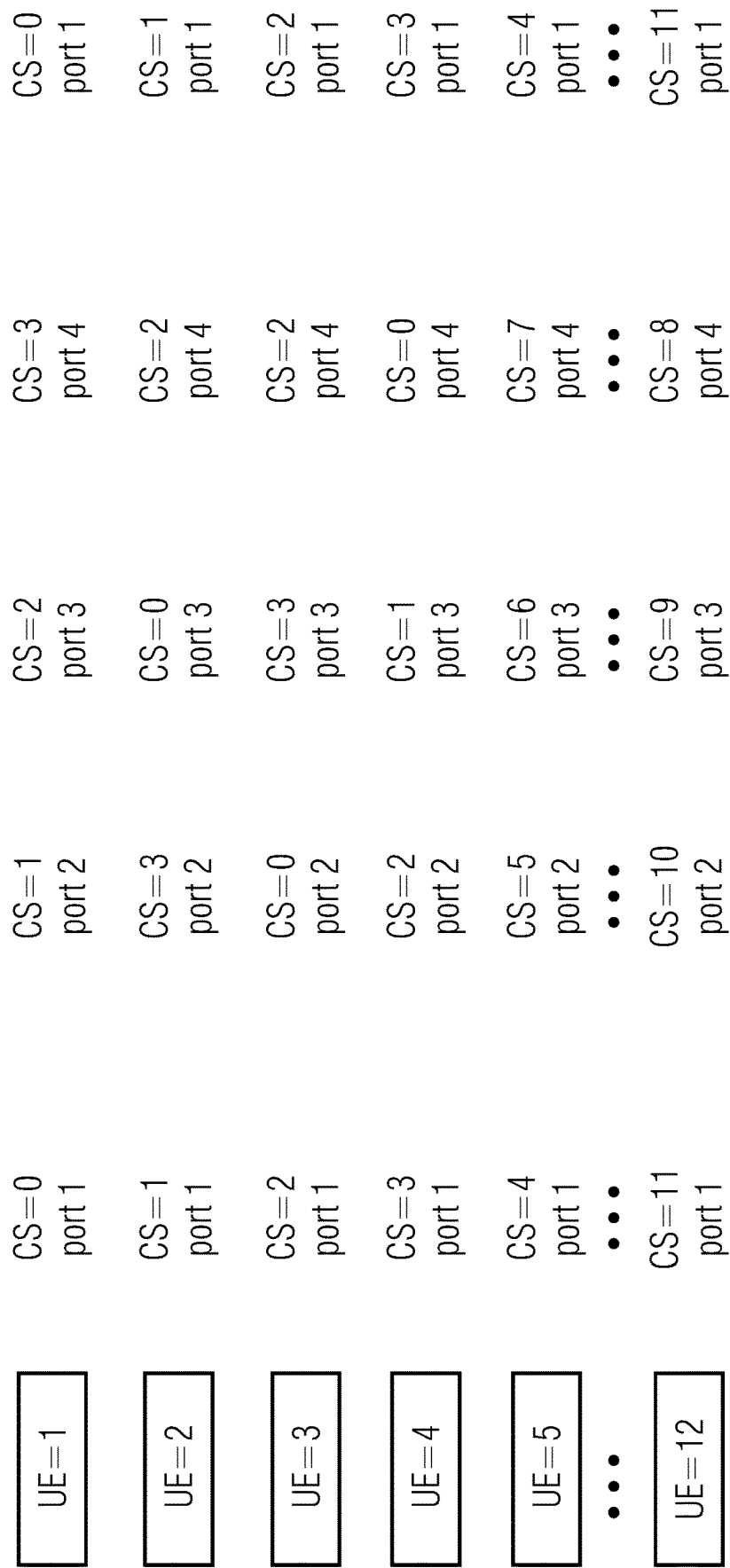
FIG. 13 illustrates an example for an RE allocation according to an embodiment.

Two options may, e.g., be considered:
1. The number of OFDM symbols may, for example, not be changed. In each time interval the transmitter switch to a different antenna port. FIG. 13 illustrates an example for an RE allocation according to an embodiment. The overall RE allocation is identical as in FIG. 11, but the antenna port changes sequentially.
2. 4 OFDM symbols per slot may, e.g., be employed. Especially if the time interval is long it may be better to use 4 consecutive OFDM symbols ensuring spatially consistent SRS transmissions. The time interval and allocation of the cyclic shift values may be identical to FIG. 11, but instead of one OFDM symbols 4 OFDM symbols are used per slot.

Figure 14:
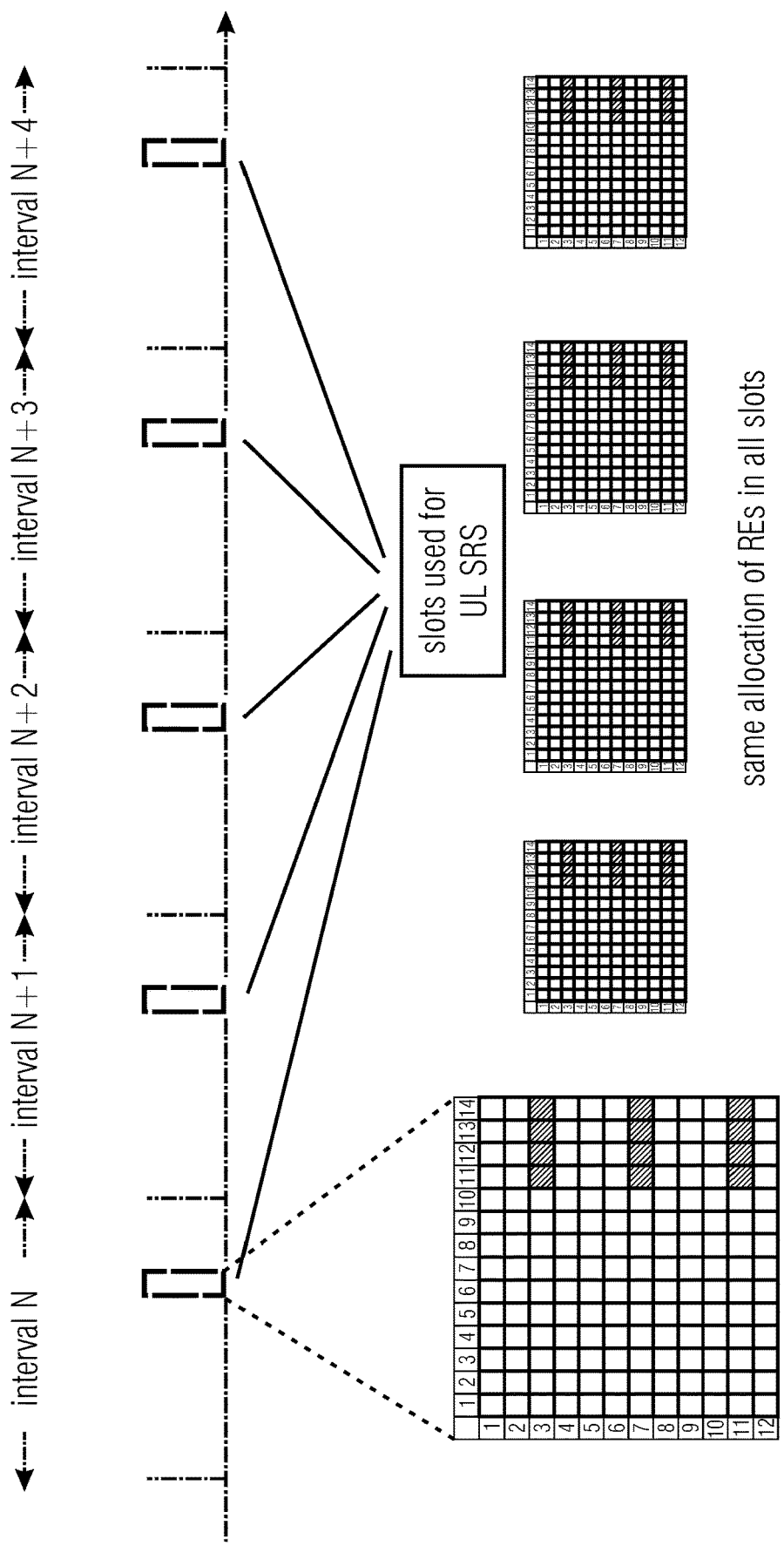
FIG. 14 illustrates an example for resource allocation with fast antenna port sweep within a slot according to an embodiment. For each antenna port of a UE a different OFDM symbol may be used

FIG. 14 illustrates this example for resource allocation with "fast antenna port sweep within a slot".

If the UE supports the parallel transmission of several SRS resources over different antenna ports within one OFDM symbol the signals emitted over different antenna ports can share the same REs. A different cyclic shift values is assigned to each SRS. This reduces the number of UEs which can share the same REs. Assuming 12 cyclic shift steps can be configured and 4 steps are used per UE, 3 UEs can share the same REs. A possible configuration example is depicted in FIG. 15 and FIG.

In particular, FIG. 15 illustrates an example for the principle of multiplexing signals from different antenna ports and different UEs.

Figure 16:
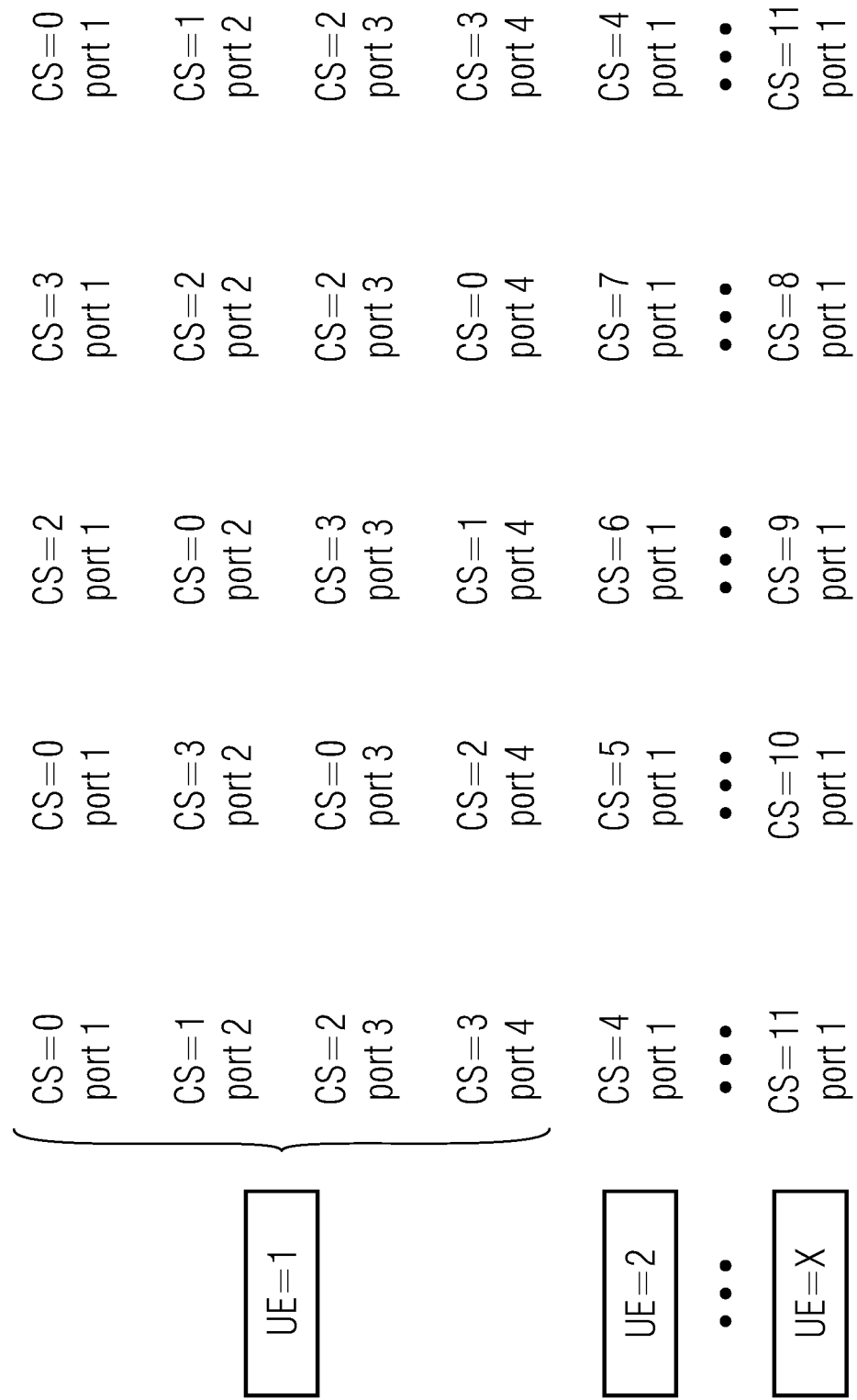
FIG. 16 depicts a parameter example according to an embodiment for configuration shown in FIG. 15.

FIG. 16 depicts a parameter example for configuration shown in FIG. 15.

Embodiments achieve a reduction of the needed resources if many devices are localized in parallel. Possible application scenarios are, for example a tracking of many objects in an industrial environment, or a minimization of the number of slots used for positioning applications.

Standards like 4G and 5G use power control procedures to ensure that the signals of different UEs arrive at a desired signal level at the serving gNB. Furthermore, the power control procedures shall minimize the interference to other links. Obviously, it is difficult to fulfill these criteria for several receive points in parallel. To reach a faraway TRP a high transmit power may be needed. This may cause a lot of interference.

According to embodiments, it may, e.g., be possible to reserve time slots (or a set of OFDM symbols) for positioning applications. If these slots are used for positioning purpose only different rules for interference coordination can be applied. To minimize the impact to the main application of a wireless network, the data communication, the capacity share used for positioning applications shall be minimized.

In the following, a particular possible receiver structure according to an embodiment is described.

Figure 17:
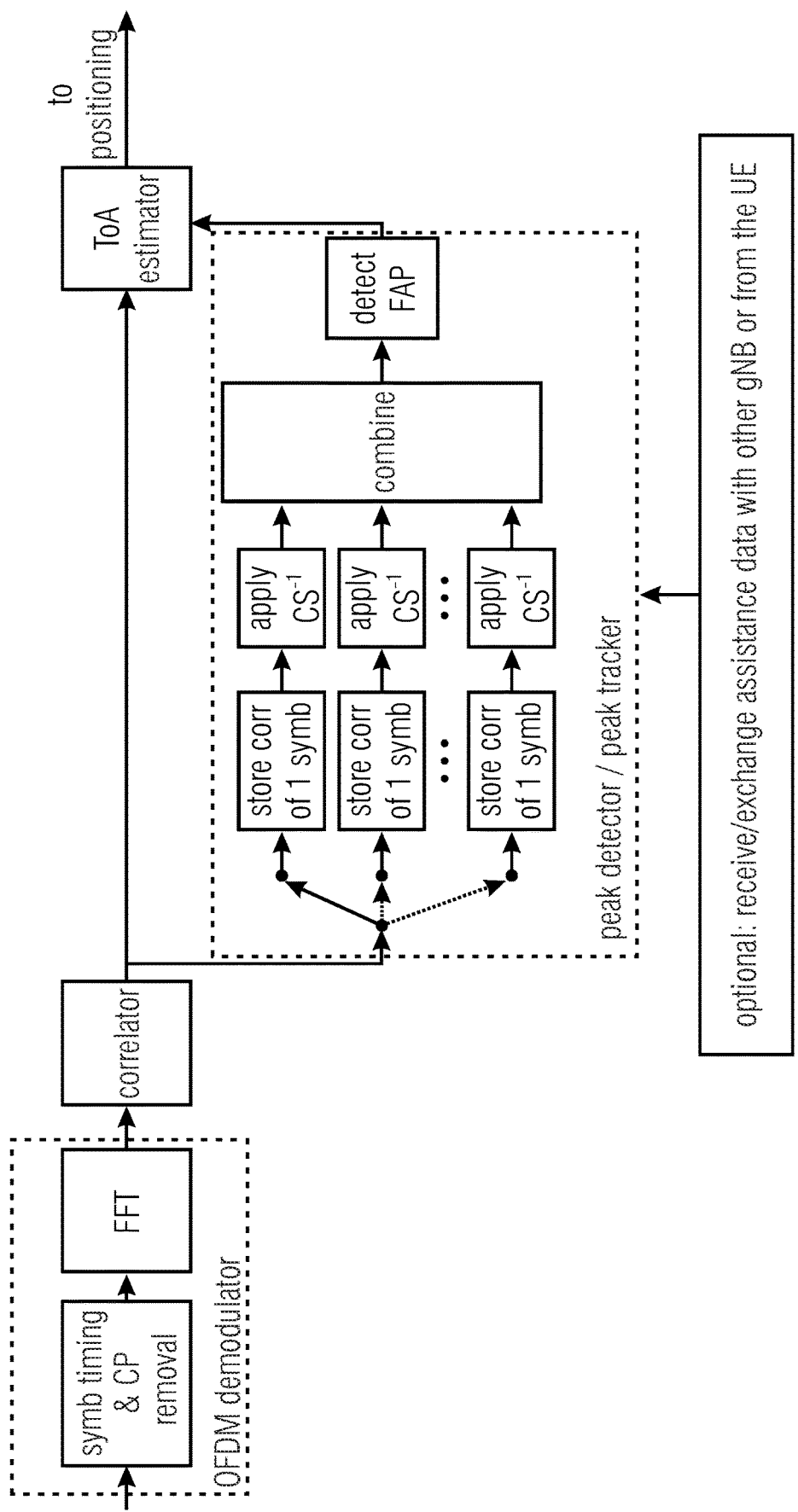
FIG. 17 illustrates an example for a receiver architecture according to an embodiment.
Figure 18A:
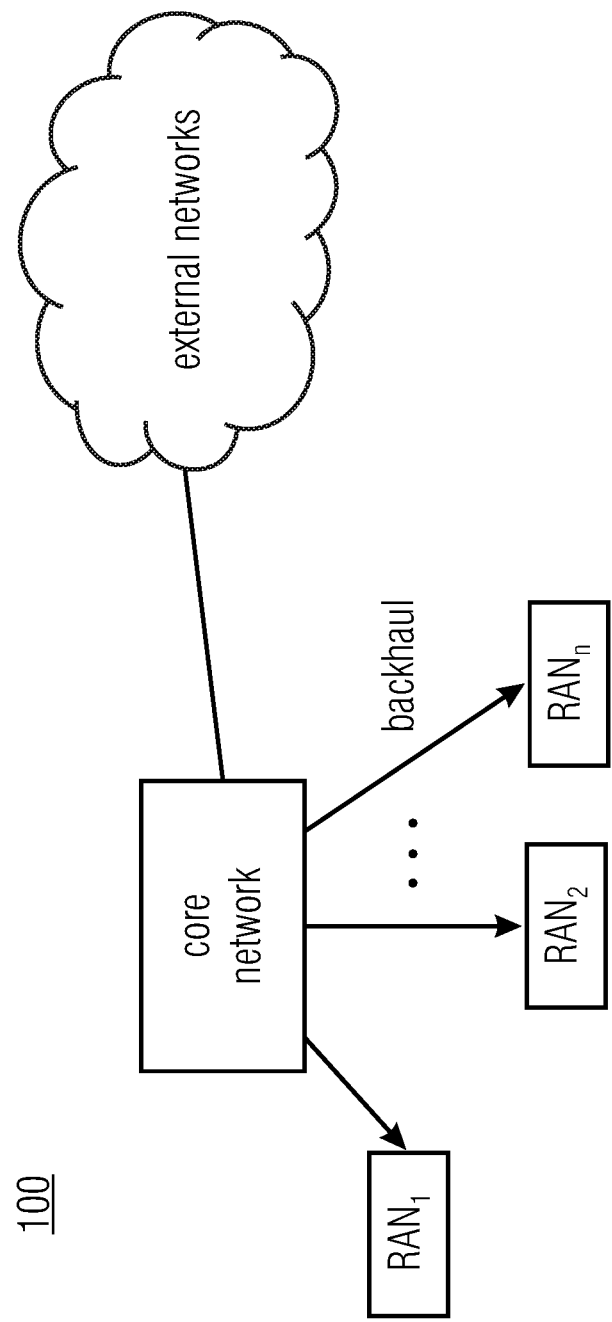
FIGS. 18a, 18b illustrates a schematic representation of an example of a terrestrial wireless network.
Figure 18B:
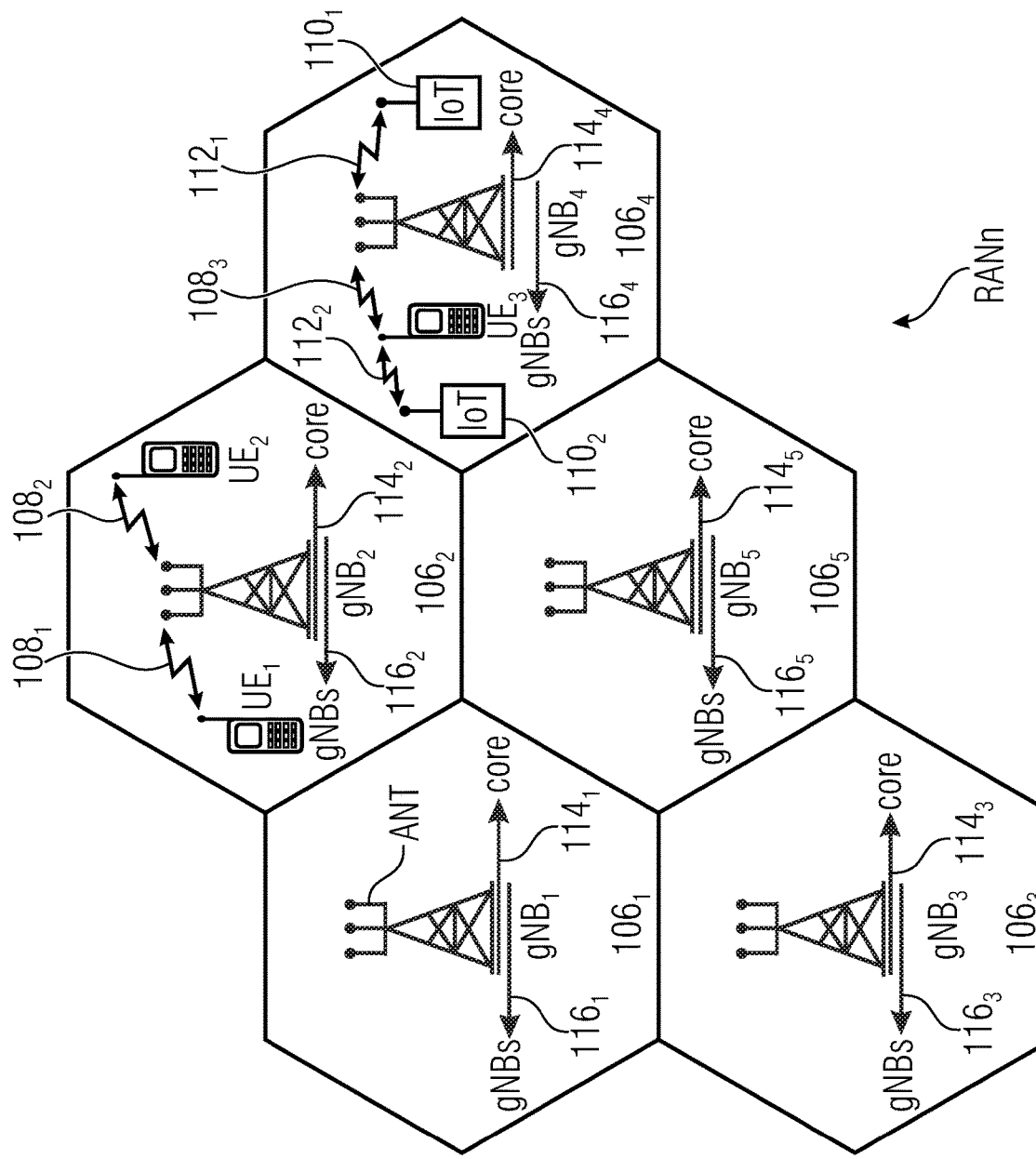

FIG. 17 illustrates an example for a receiver architecture according to an embodiment. In particular, FIG. 17 depicts an overview for a possible receiver architecture/algorithm.

The first steps of the input signal processing are inline with a OFDM demodulator, for example, employing OFDM symbol timing and cyclic prefix (CP) removal, and a FFT.

For a group using the same REs and different cyclic shifts only, the signal may, e.g., be multiplied with the conjugate values of the refSequence. This implements the cyclic correlation in the frequency domain.

To identify the peak related to the wanted UE a peak-detector/peak tracker may, e.g., be used. Assuming the cyclic shift hopping period is K, the correlator output of the last K symbols are stored.

K correlator outputs may, e.g., combined, for example, as follows:
  The correlator output may, e.g., be cyclically shifted in time to compensate the cyclic shift inserted by the UE ("apply $CS^{-1}$"). This can be done in the time or frequency domain (in the frequency domain a time delay is implemented by applying a phase ramp).
  E.g. these cyclic sift corrected signals can be combined. In the simplest case by adding the magnitude of the signals (see FIG. 10a and FIG. 10b).
  The combined signal may, e.g., be used to detect first arriving path (FAP) of the wanted signal or at least to determine a (narrow) time window in which the FAP is expected.
  The estimated (or predicted) FAP position may, e.g., be provided to the ToA-estimator. The
  ToA estimator may calculate the final ToA value with a high resolution using the last receive signal. Optional (not shown in the figure) the ToA-estimator can also use the stored data from previously received signals.
  For advanced algorithms the peak detector/peak tracker and ToA estimator may, e.g., exchange information with other gNBs. Possible assistance data, may, for example, be, adjustments of the timing advance (TA), and/or estimation of UE frequency offsets, etc.

Embodiments on the receiver side may, e.g., be capable to address different situations.
  If CIRs (channel impulse responses) do not overlap:
    According to an embodiment, the receiver detects peaks; the assignment of the peaks to the UEs is conducted by the LMF.
    According to another embodiment, the receiver knows the cyclic shift (CS) values and conducts the assignment of the peaks to the UEs using the CS values.
  If the CIRs, however, do overlap (and the assignment of the peaks to UEs is no longer unique):
    In an embodiment, the receiver reports the 'raw CIRs' to the LMF, and the LMF conducts the assignment of the peaks to the UEs.

In another embodiment, the receiver conducts a 'combining' and uses the combining for the assignment. After conducting the assignment, the assignment may, e.g., be used for predicting the assignment for the next slot. Thus, a sliding combiner may, e.g., continuously follow the peaks.

In the example of FIG. 17:
1) The receiver receives a sum of the signals from different transmitters.
2) At first, a (joint) correlation is conducted with the base sequence.
3) If the CIRs do not overlap, no intermediate processing has to be done and the ToA (time of arrival) estimator conducts the further processing.
4) If the correlation functions, however, do overlap, then the peaks have to be assigned.
5) Peak assignment may, e.g., be conducted by a peak detector/tracking module which conducts the following:
  a) N symbols are stored
  b) The cyclic shift is reversed ($CS^{-1}$)
  c) Depending on the a period length of N symbols, N different CS values (CS value sequence) per UE are obtained
  d) The obtained sequences are different for each of the UEs
  e) If $UE_i$ shall be detected, then $CS^{-1}$ that corresponds to the CS value sequence for $UE_i$ is applied
  f) By this, the peaks that relate to $UE_i$ are added to each other, while the other peaks remain unchanged, as can be seen in FIG. 10a and FIG. 10b.

In the following, particular embodiments and related higher layer procedures of embodiments are described.

At first, a particular cyclic shift hopping pattern is described.

In accordance with an embodiment, the UE is configured with one or more cyclic shift values for the SRS transmission associated with an SRS resource comprising one or more SRS ports. The cyclic shift value varies per SRS port for different OFDM symbols and/or different slots according to a pre-defined hopping pattern.

A cyclic shift hopping pattern is defined by a set of cyclic shift values which are associated with a single SRS port. The cyclic shifts according the cyclic shift values are applied to the SRS transmit sequence in different OFDM symbols and/or slots.

In one option, the cyclic shift hopping pattern associated with a SRS port has a periodicity of N symbols or N slots. This means the cyclic shift values applied to the transmit sequence of an SRS port are repeated after N symbols and/or N slots.

In one option, the cyclic shift hopping pattern associated with the SRS transmit sequence of an SRS port is defined by a set of unique values, defined by $\{0,1,2,\ldots,(n_{SRS}^{cs,max}-1)\}$, wherein for any two values a and b from the cyclic shift hopping pattern, it holds a≠b. Here, $n_{SRS}^{cs,max}$ denotes the maximum number of possible cyclic shift values associated with the SRS transmit sequence.

When the SRS resource comprises at least two SRS ports, the cyclic shift values applied to the SRS transmit sequences associated with two different SRS ports may be different for the same OFDM symbol and/or slot.

In accordance with an embodiment, the cyclic shift values of the hopping pattern are defined a function of one or more parameters. The cyclic shift value of the hopping pattern is based at least on one of the following parameters:

the cyclic shift index $n_{SRS}^{cs,i}$ provided by the network,
the index pattern pattern$_i$ provided by the network,
the slot number $n_{s,f}^{\mu}$ of the radio frame,
the OFDM symbol number l, wherein l=0 corresponds to the first OFDM symbol of the SRS transmission,
the OFDM symbol index l' of the slot that corresponds to the first OFDM symbol of the SRS transmission in the given slot,
the antenna port $p_i$.

In the following, a configuration of cyclic shift hopping pattern according to particular embodiments is described.

In an embodiment, the SRS configuration may, e.g., be provided to the UE from a network node or the LMF, indicated or updated via an RRC message, downlink control information (DCI), and/or Media Access Control Element (MAC-CE), LTE Positioning Protocol and/or the like.

In an embodiment, the SRS configuration for a given UE may, e.g., be provided to an LMF, TRP, RP, gNB or the like, and indicated or updated in an NRPPa message and/or the like.

In an embodiment, the CS values of the cyclic shift pattern may, e.g., be a priori known by the UE (i.e., they are fixed by specification).

In an embodiment, the CS values of the cyclic shift pattern may, e.g., be configured by a network node via a higher layer (RRC or MAC-CE) or via a physical layer (e.g., DCI).

According to embodiments, with respect to simultaneous transmissions or antenna switching, simultaneous transmission means different CS.

In some aspects, the UE is configured by the network node to transmit on a first SRS port an SRS transmit sequence associated with a cyclic shift value and a on a second SRS port an SRS transmit sequence associated with a cyclic shift value.

In some aspects, the UE may be configured to transmit the SRS simultaneously on the same REs in the same OFDM symbol and/or slot on at least two different SRS ports, wherein the SRS transmit sequence associated with an SRS port is associated with a different cyclic shift value.

Some embodiments relate to muting.

In some aspects, the UE is configured with a higher layer configuration, wherein the higher layer configuration includes an indication of a muting for one more SRS transmissions for the configured SRS resource or SRS resources.

In some aspects (see FIG. 8a and FIG. 8b), a network entity (for example the gNB) may assign multiple SRS resources to one or more UEs or/and SRS ports that are associated with the same REs and a cyclic shift pattern within each resource. Whereby the cyclic shift pattern enables resolving the ambiguity by ensuring that the interference resulting from different configuration is randomized.

In the following, particular embodiments that relate to the reception point are described.

In embodiments, a reception point may, e.g., be able to differentiate an SRS resource or a UE associated with one or more SRS resources (see FIG. 10a and FIG. 10b) from multiple SRS signals transmitted on the same REs based on the known CS pattern. Where the CS pattern can be provided by a NW entity (like LMF), a serving gNB or the UE.

In some embodiments (see FIG. 15), a method may, e.g., be performed by the RP which combines at least two timely separated signals to identify an SRS resource based on the known CS configuration from different ports of the same UE.

In some embodiments, A method may, e.g., be performed by the RP which combines at least two timely separated signals to identify an SRS resource based on the known CS configuration assigned for different UEs.

According to some embodiments (see FIG. 8a and FIG. 8b), a reception point may, e.g., resolve the ambiguity by ensuring that the interference resulting from different configuration is randomized.

In some embodiments, the Reception Point may, for example, be an RP, TRP, gNB for UL transmission or a UE for cross link interference or sidelink transmission.

In the following, particular examples based on SRS as defined in Rel-15 (release 15 of 5G) for communication purposes are described.

At first, higher layer configuration according to particular embodiments is considered.

A network entity (example an s-gNB) may, e.g., configure the UE via a higher layer (e.g., RRC or MAC-CE) with an SRS-Config instructing the UE to use a cyclic shift pattern, CSpattern, for one or more SRS resources.

In an embodiment, SRS Rel-15 procedure to initialize a CS pattern and CS Step size, may, e.g., be employed.

It should be noted that Rel-16 (release 16 of 5G) includes additional configurations for SRS for positioning purposes. These additional configurations support only one SRS port. Therefore, the procedure described in this embodiment is based on the SRS configurations for communication purpose supporting several SRS ports. This procedure is available in Rel-15.

In one example, the cyclic shift $\alpha_{initial}$ for antenna port $p_i$ may, e.g., be given as $$\alpha_{initial} = 2\pi \frac{n_{SRS}^{cs,i}}{n_{SRS}^{cs,max}}$$

$$n_{SRS}^{cs,i} = \left(n_{SRS}^{eff} + \frac{n_{SRS}^{cs,max}(p_i - 1000)}{N_{AP}}\right) \bmod n_{SRS}^{cs,max}$$

where $n_{SRS}^{cs} \in \{0, 1, \ldots, n_{SRS}^{cs,max}-1\}$ may, e.g., be comprised in the higher layer parameter transmissionComb and $n_{SRS}^{cs,max}$ represents the maximum number of cyclic shifts.

In some aspects, the cyclic shift values $\alpha_{eff}(n_{s,f}^{\mu}, 1, 1')=f^{(n_{s,f}^{\mu}, l, l')}(\alpha_{initial})$ of the cyclic shift pattern mentioned above are based on a parameter $\alpha_{initial}$ and at least on of the following parameters:
the slot number $n_{s,f}^{\mu}$ of the radio frame,
the OFDM symbol index l of the SRS transmission, wherein l=0 corresponds to the first OFDM symbol of the SRS transmission,
the OFDM symbol index l' of the slot that corresponds to the first OFDM symbol of the SRS transmission in the slot given In some aspects, the higher layer parameters provides the cyclic values $\alpha_{eff}(n_{s,f}^{\mu}, 1, 1')$ of the hopping pattern, or an effective cyclic index $n_{SRS}^{eff}(n_{s,f}^{\mu}, 1, 1')$ where $\alpha_{eff}(n_{s,f}^{\mu}, 1, 1')$ is derived by the UE, wherein $$\alpha_{eff}(n_{s,f}^{\mu}, l, l') = 2\pi \frac{n_{SRS}^{cs,i}(n_{s,f}^{\mu}, l, l')}{n_{SRS}^{cs,max}} + 2\pi \left[\frac{n_{SRS}^{eff}(n_{s,f}^{\mu}, l, l')}{n_{SRS}^{cs,max}}\right]$$

$$n_{SRS}^{cs,i} = \left(n_{SRS}^{eff} + \frac{n_{SRS}^{cs,max}(p_i - 1000)}{N_{AP}}\right) \bmod n_{SRS}^{cs,max}$$

In some embodiments, the cyclic shift pattern may, e.g., also be applied in the stage mapping to physical resources for each OFDM symbol provided in [TS38.211, Version 16.0.0, section 6.4.1.4.3]. The effective cyclic shift is then given by the initial cyclic shift and an effective cyclic shift which applies: $e^{j(\alpha_{initial}n+\gamma(l'))}$ to an SRS transmitted on a given SRS resource.

In some embodiments, one or more higher layer parameters may, e.g., provide the effective cyclic shift pattern.

In some embodiments, the UE may, e.g., directly be provided with an effective cyclic shift if configured as the higher layer parameters CS-pattern $\alpha_{eff}$ for a CS pattern enabling the UE to transmit with more than CS for two transmission within a resource separated in time by a number of subframes, slots or OFDM symbols within a slot.

In some embodiments, an additional muting pattern on certain CS slots may, e.g., be provided. Higher layer parameter providing the UE indication on the slots within a pattern configured in a resource (or resource set) to mute.

In an embodiment, a UE procedure related to CS Pattern, may, e.g., comprise:
  The UE transmits an SRS with a cyclic shift pattern if provided SRS-csPatteren; otherwise, the UE transmits an SRS without a cyclic shift pattern.
  The UE transmits the SRS for the multiple CS patterns using the same spatial domain transmission filter as for a SRS transmission provided by higher layer SRS-spatial relation.
  For aperiodic the signaling goes beyond a resource and should be provided per set.
  For periodic or SP the configuration can be provided per resource or resource set.

Embodiments provide an alternative concept to staggering to solve the ambiguity problem if high COMB factors are combined with cyclic shifts.

Compared to staggering, it is advantageous that embodiments can be combined with high update rate of the SRS and is therefore useful especially for moving devices.

Some embodiments reduce or minimize the number of OFDM symbols needed per slot. The OFDM symbols related to one UE can be transmitted in different symbols (in this case de-staggering with phase correction may not work).

Technical Application Area may, e.g., be positioning applications where many UEs shall be located in parallel.

In the following, further examples are provided.

According to an example, a method for transmitting a sequence of reference signal useful for ToA measurements is provided, wherein
  several transmitter (TX) use the same time/frequency resources,
  the TX sequences are derived from the same base sequence, but each TX uses a different "cyclic shift",
  the cyclic shift assigned to one TX is periodically changed using a predefined pattern,
  different patterns are assigned to each TX. The pattern are selected that the order of the cyclic shift values is randomized.

In a particular example, the base sequence may, e.g., be a sequence with zero auto-correlation properties.

According to a particular example, the base sequence may, e.g., be a Zadoff-Chu sequence.

In a particular example, OFDM modulation may, e.g., be employed.

According to a particular example, several sequences may, e.g., be transmitted by one TX using different antennas.

In a particular example, one of the above-described hopping patterns may, e.g., be employed.

According to a particular example, one of the above-described receiver algorithms may, e.g., be employed.

In the following, further examples of the invention are provided.

It should be noted that cyclic shift in time does not mean the shift is implemented in the time domain. Taking into account the properties of the FFT the cyclic shift in time can be also implemented in the frequency domain.

Example 1: An apparatus for a wireless communication system, wherein the apparatus is to transmit a reference signal on a common set of resource elements, REs, the common set of REs being used by one or more further apparatuses in the wireless communication system, so that the reference signal of the apparatus and one or more further reference signals of the one or more further apparatuses use the same REs,
  wherein the apparatus is to transmit the reference signal using a plurality of symbols,
  wherein, to transmit the reference signal,
    the apparatus is to determine, for each antenna port of one or more antenna ports, for each symbol of a set of the plurality of symbols, a transmission sequence by cyclically shifting in time a base sequence or a sequence derived from the base sequence depending on a set of cyclic shift parameters defining one or more sequences of cyclic shifts, shift pattern, and
    the apparatus is to apply, for each symbol of the plurality of symbols, the transmission sequence for said symbol on said symbol.

Example 2: An apparatus according to example 1,
wherein the apparatus is to receive information on the set of cyclic shift parameters by a network node of the wireless communication system.

Example 3: An apparatus according to example 1 or 2,
wherein the apparatus is to receive information on the set of cyclic shift parameters within an RRC message, and/or within downlink control information, and/or within a Media Access Control Element, and/or within an LTE or NR Positioning Protocol.

Example 4: An apparatus according to one of the preceding examples,
wherein the apparatus is to determine, for each symbol of the plurality of symbols, the transmission sequence of said symbol by cyclically shifting in time the base sequence or the sequence derived from the base sequence depending on the set of cyclic shift parameters, such that the transmission sequence for a first one of the plurality of symbols is different from the transmission sequence for a second one of the plurality of symbols.

Example 5: An apparatus according to one of the preceding examples,
wherein the apparatus is to determine, for a first symbol of the plurality of symbols, the transmission sequence for said first symbol according to the set of cyclic shift parameters by conducting a first cyclical shift on the base sequence, and
wherein the apparatus is to determine, for second first symbol of the plurality of symbols, the transmission sequence for said second symbol according to the set of cyclic shift parameters by conducting a second cyclical shift on the base sequence, such that the transmission sequence for said second symbol is different from the transmission sequence for said first symbol.

Example 6: An apparatus according to one of the preceding examples,
wherein the set of cyclic shift parameters employed by the apparatus is different from a further set of cyclic shift parameters employed by the one or more further apparatuses in the same area using the same REs for transmitting one of the one or more further reference signals.

Example 7: An apparatus according to one of the preceding examples,
wherein the base sequence is a sequence with zero autocorrelation properties.

Example 8: An apparatus according to one of the preceding examples,
wherein the base sequence is a Zadoff-Chu sequence.

Example 9: An apparatus according to one of the preceding examples,
wherein the apparatus is to employ OFDM modulation,
wherein the plurality of symbols are a plurality of OFDM symbols, and
wherein the apparatus is to apply, for each OFDM symbol of the plurality of OFDM symbols, the transmission sequence for said OFDM symbol on said OFDM symbol.

Example 10: An apparatus according to one of the preceding examples,
wherein the apparatus is to employ two or more antennas, such that each of the two or more antennas transmits the transmission sequence for at least one of the plurality of symbols.

Example 11: An apparatus according to one of the preceding examples,
wherein the apparatus comprises the one or more antenna ports.

Example 12: An apparatus according to one of the preceding examples,
wherein the one or more antenna ports are two or more antenna ports.

Example 13: An apparatus according to example 12,
wherein the apparatus is to apply a different cyclic shift at each of the two or more antenna ports to cyclically shift the base sequence.

Example 14: An apparatus according to one of the preceding examples,
wherein the common set of resource elements is a common set of time/frequency resource elements.

Example 15: An apparatus according to one of the preceding examples,
wherein each of a plurality of functions defines a cyclic shift parameter set, and
wherein the apparatus is to receive information which function to choose out of the plurality of functions to determine the set of cyclic shift parameters.

Example 16: An apparatus according to one of the preceding examples,
wherein the apparatus is to receive an indication of a muting for one or more resource elements of the common set of resource elements.

Example 17: An apparatus according to one of the preceding examples,
wherein the set of cyclic shift parameters defines one or more cyclic shift values.

Example 18: An apparatus according to example 17,
wherein the set of cyclic shift parameters defines N cyclic shift values,
wherein the set of cyclic shift parameters has a periodicity of N slots or symbols such that the N cyclic shift values that are used for determining the transmission sequence for each symbol of the plurality of symbols from the base sequence are repeated after N slots or symbols.

Example 19: An apparatus according to example 17 or 18,
wherein the set of cyclic shift parameters comprises N cyclic shift values, wherein for each pair of a first cyclic shift value and a second cyclic shift value of the N cyclic shift values, the second cyclic shift value is different from the first cyclic shift value.

Example 20: An apparatus according to one of examples 17 to 19,
wherein the one or more cyclic shift values of the set of cyclic shift parameters depend on at least one of
a cyclic shift index provided by another entity of the wireless communication system,
an index pattern pattern$_i$ provided by a further entity of the wireless communication system,
a slot number of a radio frame,
an OFDM symbol number,
an OFDM symbol index of a slot that corresponds to the a OFDM symbol of an SRS transmission in the given slot,
an antenna port of the apparatus.

Example 21: An apparatus according to one of examples 17 to 20,
wherein a cyclic shift value of the one or more cyclic shift values of the set of cyclic shift parameters defines by how much time the base sequence is cyclically shifted in time depends on a comb factor and on a cyclic shift index.

Example 22: An apparatus according to example 21,
wherein said cyclic shift value further depends on a duration of said symbol.

Example 23: An apparatus according to example 21 or 22,
wherein a distance $d\tau$ between the correlation peaks of two sequences using different cyclic shifts is defined by $$d\tau = \frac{1}{SCS} \cdot \frac{1}{K_{TC}} \cdot \left( \frac{n_{SRS,}^{cs,UEj}}{n_{SRS}^{cs,max}} - \frac{n_{SRS}^{cs,UEi}}{n_{SRS}^{cs,max}} \right)$$

$$d\tau = \frac{1}{SCS} \cdot \frac{1}{K_{TC}} \cdot \left( \frac{n_{SRS,}^{cs,UEj}}{n_{SRS}^{cs,max}} - \frac{n_{SRS}^{cs,UEi}}{n_{SRS}^{cs,max}} \right)$$

$$d\tau = \frac{1}{SCS} \cdot \frac{1}{K_{TC}} \cdot \left( \frac{n_{SRS,}^{cs,UEj}}{n_{SRS}^{cs,max}} - \frac{n_{SRS}^{cs,UEi}}{n_{SRS}^{cs,max}} \right)$$

wherein SCS indicates a sub carrier spacing,
$K_{TC}$
$K_{TC}$ wherein indicates the comb factor,
wherein $n_{SRS}^{cs}$ indicates the cyclic shift index,
wherein $n_{SRS,}^{cs,UEj}$ indicates a selected value for the apparatus,
wherein $n_{SRS,}^{cs,UEi}$ indicates a selected value for an i-th apparatus of the one or more further apparatuses,
wherein $n_{SRS}^{cs,max}$ indicates a number of cyclic shift steps.

Example 24: An apparatus according to one of examples 17 to 23,
wherein at least one of the one or more cyclic shift values is a cyclic shift value $\alpha_{initial}$ for an antenna port being defined as $$\alpha_{initial} = 2\pi \frac{n_{SRS}^{cs,i}}{n_{SRS}^{cs,max}} \text{ wherein}$$

$$n_{SRS}^{cs,i} = \left( n_{SRS}^{eff} + \frac{n_{SRS}^{cs,max}(p_i - 1000)}{N_{AP}} \right) \bmod n_{SRS}^{cs,max}$$

wherein $n_{SRS}^{cs,max}$ represents a maximum number of cyclic shifts, wherein $p_i$ indicates an antenna port identifier, wherein $N_{AP}$ indicates a number of the antenna ports, wherein $n_{SRS}^{eff}$ indicates an effective cyclic index.

Example 25: An apparatus according to one of examples 17 to 24, wherein at least one of the one or more cyclic shift values is a cyclic shift value $\alpha_{eff}(n_{s,f}^{\mu}, l, l')$ for an antenna port being defined as $$\alpha_{eff}\left(n_{s,f}^{\mu}, l, l'\right) = 2\pi \frac{n_{SRS}^{cs,i}\left(n_{s,f}^{\mu}, l, l'\right)}{n_{SRS}^{cs,max}} + 2\pi \left[ \frac{n_{SRS}^{eff}\left(n_{s,f}^{\mu}, l, l'\right)}{n_{SRS}^{cs,max}} \right] \text{ wherein}$$

$$n_{SRS}^{cs,i} = \left( n_{SRS}^{eff} + \frac{n_{SRS}^{cs,max}(p_i - 1000)}{N_{AP}} \right) \bmod n_{SRS}^{cs,max}$$

wherein $n_{SRS}^{cs,max}$ represents a maximum number of cyclic shifts, wherein $p_i$ indicates an antenna port identifier, wherein $N_{AP}$ indicates a number of the antenna ports, wherein $n_{SRS}^{eff}$ indicates an effective cyclic index, wherein $n_{SRS}^{cs,i}$ indicates a resulting parameter used to configure the cyclic shift for the antenna port i, wherein $n_{s,f}^{\mu}$ indicates a slot number of a radio frame, wherein l indicates an OFDM symbol index of the SRS transmission, wherein l' indicates an OFDM symbol index of the slot that corresponds to a first OFDM symbol of a SRS transmission in a slot given.

Example 26: An apparatus for a wireless communication system, wherein the apparatus is to receive a reference signal from another apparatus on a set of resource elements, REs, the set of REs being used by a plurality of transmitting apparatuses in the wireless communication system, so that the reference signal from the other apparatus and one or more further reference signals from the one or more further apparatuses use the same REs, wherein, to receive said reference signal from said other apparatus,
the apparatus is to find one or more peaks in a current slot in a channel impulse response, and
the apparatus is to map the one or more peaks found in the current slot to one or more previously found peaks in one or more previous slot.

Example 27: An apparatus according to example 26,
wherein the apparatus is to continuously update information for delay and amplitude for each peak to keep for the prediction of the next occurrence of a peak.

Example 28: An apparatus according to example 26 or 27,
wherein the apparatus is to predict the positioning of the next occurrence of a peak using the information from previously received symbols.

Example 29: An apparatus according to one of examples 26 to 28,
wherein the apparatus is to store information on the one or more peaks found in the current slot that provides information on at least one of:
an amplitude,
a delay,
a phase,
a delay-drift,
a phase-drift,
peak appearance statistics.

Example 30: An apparatus according to one of examples 26 to 29,
wherein the apparatus is to map the one or more peaks found in the current slot to one or more previously found peaks in one or more previous slot
by calculating one or more expected delays for the current slot, and
by mapping measured peaks to peaks stored in a memory of the apparatus.

Example 31: An apparatus according to example 30,
wherein, if one of the one or more founds peaks was found in the memory, the apparatus is to increase a peak appearance statistics,
wherein, if one of the one or more founds peaks was not found in the memory, the apparatus is to add a new peak in the memory with initial value for peak appearance statistics.

Example 32: An apparatus according to example 31,
wherein, if a peak was not found in the current slot but exists in the memory, the apparatus is to reduce the peak appearance statistics,
wherein the apparatus is to eliminate a no longer active peak from the memory, if the peak appearance statistics becomes smaller than threshold.

Example 33: A wireless communication system, comprising:
at least two apparatuses according to one of examples 1 to 25, and
at least one apparatus according to one of examples 26 to 32,
wherein the apparatus according to one of examples 26 to 32 is to receive a reference signal from at least one of the at least two apparatuses according to one of examples 1 to 25.

Example 34: A wireless communication system according to example 33,
wherein each of the at least two apparatuses according to one of examples 1 to 25 has a set of cyclic shift parameters that is different from the set of cyclic shift parameters of any other apparatus of the at least two apparatuses according to one of examples 1 to 25.

Example 35: A wireless communication system according to example 33 or 34,
wherein the wireless communication system comprises another apparatus,
wherein each of the at least two apparatuses according to one of examples 1 to 25 is to receive its set of cyclic shift parameters from said other apparatus.

Example 36: A method for a wireless communication system, wherein an apparatus transmits a reference signal on a common set of resource elements, REs, the common set of REs being used by one or more further apparatuses in the wireless communication system, so that the reference signal of the apparatus and one or more further reference signals of the one or more further apparatuses use the same REs,
wherein the method comprises transmitting, by the apparatus, the reference signal using a plurality of symbols,
wherein transmitting the reference signal by the apparatus comprises
determining, for each antenna port of one or more antenna ports, for each symbol of a set of the plurality of symbols, a transmission sequence a transmission sequence by cyclically shifting in time a base sequence or a sequence derived from the base sequence depending on the set of cyclic shift parameters defining one or more sequences of cyclic shifts, shift pattern, and applying, for each symbol of the plurality of symbols, the transmission sequence for said symbol on said symbol.

Example 37: A method for a wireless communication system, wherein an apparatus receives a reference signal from another apparatus on a common set of resource elements, REs, the common set of REs being used by the other apparatus and one or more further apparatuses in the wireless communication system, so that the reference signal from the other apparatus and one or more further reference signals from the one or more further apparatuses use the same REs, wherein, to receive said reference signal from said other apparatus, the apparatus finds one or more peaks in a current slot in a channel impulse response, and the apparatus maps the one or more peaks found in the current slot to one or more previously found peaks in one or more previous slot.

Example 38: Computer program having a program code for performing, when running on a computer, the method according to example 36 or 37.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, like for example, a microprocessor, a programmable computer or an electronic circuit. In some embodiments, one or more of the most important method steps may be executed by such an apparatus.

Figure 19:
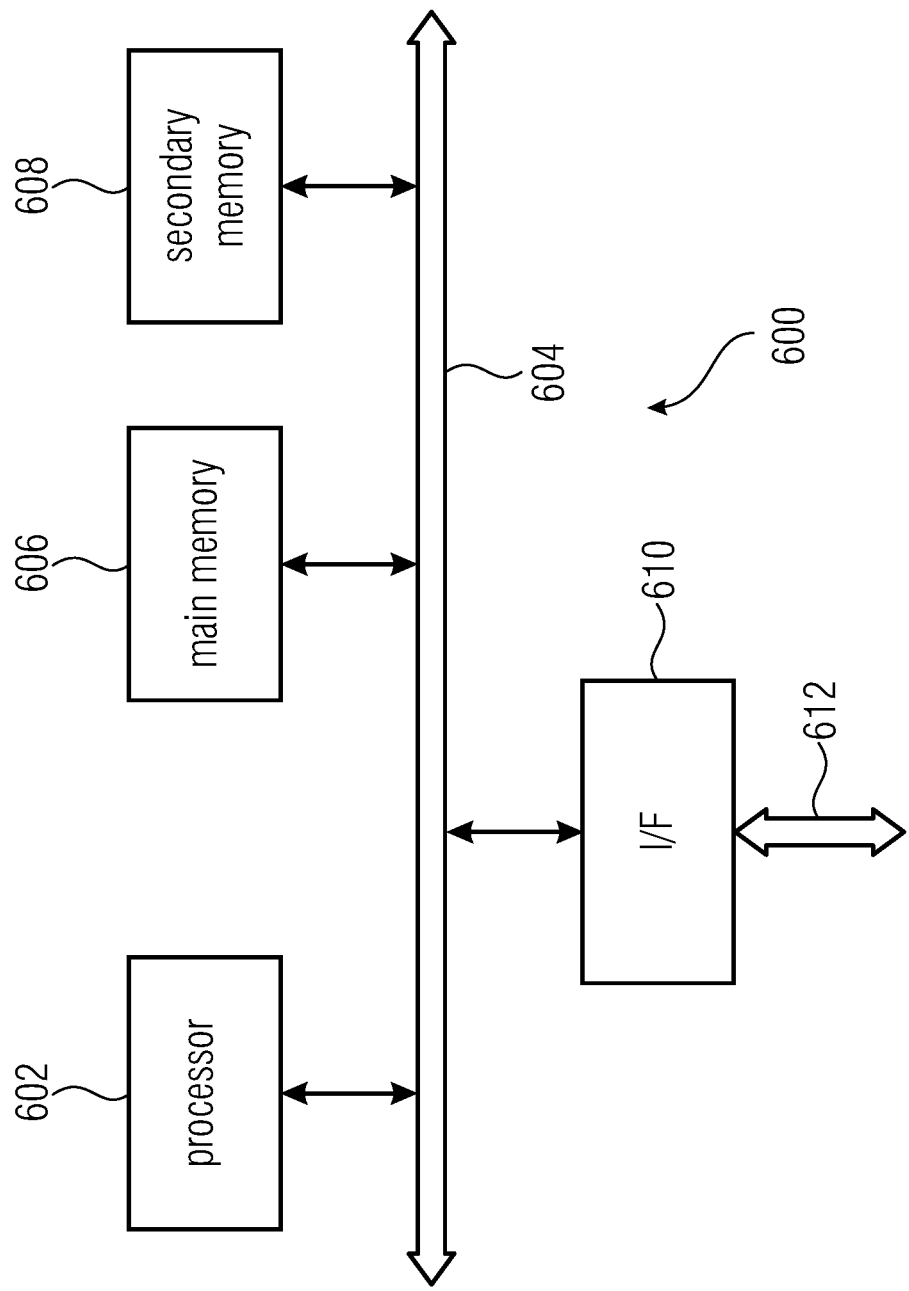
FIG. 19 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 19 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

RRC TS38.331 v16.1.0
LPP TS37.355 v16.1.0
NRPPa TS38.455 v16.0.0

ABBREVIATIONS

| Abbreviation | Definition |
|---|---|
| 3GPP | third generation partnership project |
| 5GC | 5G core network |
| BS | base station |
| UE | user equipment |
| NW | network |
| CSI-RS | channel state information reference signal |
| DMRS | demodulation reference signal |
| DOA | direction of arrival |
| E-CID | enhanced cell ID |
| eNB | evolved node b |
| E-SMLC | evolved serving mobile location center. |
| E-UTRA | evolved UMTS terrestrial radio access |
| gNB | next generation node-b |
| GPS | Global Positioning System |
| LMF | location management function |
| LMU | location measurement unit |
| LPP | LTE positioning protocol |
| LTE | Long-term evolution |
| NG | next generation |
| ng-eNB | next generation eNB |
| NG-RAN | either a gNB or an ng-eNB |

ABBREVIATIONS -continued

| Abbreviation | Definition |
|---|---|
| NR | new radio |
| NRPPa | new radio positioning protocol a |
| OTDoA | observe time difference of arrival |
| PRS | position reference signal |
| PTRS | phase tracking reference signal |
| QCL | quasi colocation |
| RAN | radio access network |
| RP | reception point |
| RSTD | reference signal time difference |
| RTOA | relative time of arrival |
| RTT | round trip time |
| CS | cyclic shift |
| SA | Standalone |
| SRS | sounding reference signal |
| TDM | Time Domain Multiplexing |
| TOF | time of flight |
| TRP | transmission reception point |
| RS | reference signal |
| QCL | quasi co-located |
| AoA | Angle of Arrival |
| AoD | Angle of Departure |
| PAS | Power Angular Spectrum |
| NR | New Radio |

The invention claimed is:

1. An apparatus for a wireless communication system, wherein the apparatus is to transmit a reference signal on a common set of resource elements (REs), the common set of resource elements being used by one or more further apparatuses in the wireless communication system, so that the reference signal of the apparatus and one or more further reference signals of the one or more further apparatuses use the same resource elements,
    wherein the apparatus is to transmit the reference signal depending on a base sequence and depending on a set of configuration parameters, or
    wherein the apparatus is to transmit the reference signal depending on a sequence derived from the base sequence and depending on a set of configuration parameters.

2. An apparatus according to claim 1,
    wherein the set of configuration parameters are a set of cyclic shift parameters.

3. An apparatus according to claim 1,
    wherein, to transmit the reference signal, the apparatus is to realize a cyclic shift in time of a signal component indicating the base sequence or indicating the sequence derived from the base sequence depending on the set of configuration parameters defining one or more sequences of cyclic shifts.

4. An apparatus according to claim 3,
    wherein the apparatus is to realize the cyclic shift in time of the signal component indicating the base sequence or indicating the sequence derived from the base sequence by determining intermediate versions of resource elements of the common set of resource elements depending on the base sequence, and by applying a phase ramp to the intermediate versions of the resource elements depending on a set of configuration parameters.

5. An apparatus according to claim 1,
    wherein, to transmit a first version of the reference signal, the apparatus is to realize a first cyclic shift in time of the signal component indicating the base sequence or indicating a sequence derived from the base sequence depending on the set of configuration parameters;

wherein, to transmit a second version of the reference signal, the apparatus is to realize a second cyclic shift in time of the signal component indicating the base sequence or indicating a sequence derived from the base sequence depending on the set of configuration parameters; wherein the second cyclic shift is different from the first cyclic shift.

6. An apparatus according to claim 5,
wherein the apparatus is to transmit the first version of the reference signal in one or more symbols of a first one of a plurality of slots, and
wherein the apparatus is to transmit the second version of the reference signal in one or more symbols of a second one of the plurality of slots.

7. An apparatus according to claim 1,
wherein the apparatus comprises two or more antenna ports,
wherein the apparatus is to transmit a different version of the reference signal for each antenna port of two or more antenna ports depending on the base sequence or the sequence derived from the base sequence and depending on the set of configuration parameters.

8. An apparatus according to claim 7,
wherein the apparatus is to realize for each of the two or more antenna ports, a cyclic shift in time of the signal component indicating the base sequence or indicating the sequence derived from the base sequence depending on the set of configuration parameters defining one or more sequences of cyclic shifts, such that the cyclic shift in time for a first one of two or more antenna ports is different from the cyclic shift in time for a second one of two or more antenna ports.

9. An apparatus according to claim 1,
wherein the apparatus is to receive information on the set of configuration parameters by a network node of the wireless communication system, or
wherein the apparatus is to receive information on the set of configuration parameters within an RRC message, and/or within downlink control information, and/or within a Media Access Control Element, and/or within an LTE Positioning Protocol, or
wherein the set of configuration parameters employed by the apparatus is different from any further set of configuration parameters employed by any of the one or more further apparatuses for transmitting one of the one or more further reference signals.

10. An apparatus according to claim 1,
wherein the base sequence is a sequence with zero autocorrelation properties, or
wherein the base sequence is a Zadoff-Chu sequence.

11. An apparatus according to claim 1,
wherein the apparatus is to employ OFDM modulation,
wherein the plurality of symbols are a plurality of OFDM symbols, and
wherein the apparatus is to apply, for each OFDM symbol of the plurality of OFDM symbols, a transmission sequence for said OFDM symbol on said OFDM symbol.

12. An apparatus according to claim 1,
wherein the apparatus is to employ two or more antennas, such that each of the two or more antennas transmits a version of the reference signal, wherein the version of the reference signal transmitted by a first one of the two or more antennas is different from the version of the reference signal transmitted by a second one of the two or more antennas.

13. An apparatus according to claim 1,
wherein the common set of resource elements is a common set of time/frequency resource elements.

14. An apparatus according to claim 1,
wherein each of a plurality of functions defines a cyclic shift parameter set, and
wherein the apparatus is to receive information which function to choose out of the plurality of functions to determine the set of configuration parameters.

15. An apparatus according to claim 1,
wherein the apparatus is to receive an indication of a muting for one or more resource elements of the common set of resource elements.

16. An apparatus according to claim 1,
wherein the set of configuration parameters defines one or more cyclic shift values, or
wherein the set of configuration parameters defines N cyclic shift values, wherein the set of configuration parameters has a periodicity of N symbols such that the N cyclic shift values are repeated after N symbols, or
wherein the set of configuration parameters comprises N cyclic shift values, wherein for each pair of a first cyclic shift value and a second cyclic shift value of the N cyclic shift values, the second cyclic shift value is different from the first cyclic shift value, m or
wherein the one or more cyclic shift values of the set of configuration parameters depend on at least one of a cyclic shift index provided by another entity of the wireless communication system, an index pattern pattern$_i$ provided by a further entity of the wireless communication system, a slot number of a radio frame, an OFDM symbol number, an OFDM symbol index of a slot that corresponds to the a OFDM symbol of an SRS transmission in the given slot, an antenna port of the apparatus, or
wherein a cyclic shift value of the one or more cyclic shift values of the set of configuration parameters defines by how much time the base sequence is cyclically shifted in time depends on a comb factor and on a cyclic shift index, or
wherein said cyclic shift value further depends on a duration of said symbol.

17. An apparatus according to claim 16,
wherein a distance $d_\tau$ between the correlation peaks of two sequences using different cyclic shifts is defined by $$d\tau = \frac{1}{SCS} \cdot \frac{1}{K_{TC}} \cdot \left( \frac{n_{SRS,}^{cs,UEj}}{n_{SRS}^{cs,max}} - \frac{n_{SRS}^{cs,UEi}}{n_{SRS}^{cs,max}} \right)$$

wherein SCS indicates a sub carrier spacing,
wherein $K_{TC}$ indicates the comb factor,
wherein $n_{SRS}^{cs}$ indicates the cyclic shift index,
wherein $n_{SRS}^{cs,UEj}$ indicates a selected value for the apparatus,
wherein $n_{SRS}^{cs,UEi}$ indicates a selected value for an i-th apparatus of the one or more further apparatuses,
wherein $n_{SRS}^{cs,max}$ indicates a number of cyclic shift steps.

18. An apparatus according to claim 16,
wherein at least one of the one or more cyclic shift values is a cyclic shift value $\alpha_{initial}$ for an antenna port being defined as $$\alpha_{initial} = 2\pi \frac{n_{SRS}^{cs,i}}{n_{SRS}^{cs,max}} \text{ wherein}$$

$$n_{SRS}^{cs,i} = \left( n_{SRS}^{eff} + \frac{n_{SRS}^{cs,max}(p_i - 1000)}{N_{AP}} \right) \bmod n_{SRS}^{cs,max}$$

wherein $n_{SRS}^{cs,max}$ represents a maximum number of cyclic shifts, wherein $p_i$ indicates an antenna port identifier, wherein $N_{AP}$ indicates a number of the antenna ports, wherein $n_{SRS}^{eff}$ indicates an effective cyclic index, or is a cyclic shift value $\alpha_{eff}(n_{s,f}^\mu, l, l')$ for an antenna port being defined as $$\alpha_{eff}(n_{s,f}^\mu, l, l') = 2\pi \frac{n_{SRS}^{cs,i}(n_{s,f}^\mu, l, l')}{n_{SRS}^{cs,max}} + 2\pi \left[ \frac{n_{SRS}^{eff}(n_{s,f}^\mu, l, l')}{n_{SRS}^{cs,max}} \right] \text{ wherein}$$

$$n_{SRS}^{cs,i} = \left( n_{SRS}^{eff} + \frac{n_{SRS}^{cs,max}(p_i - 1000)}{N_{AP}} \right) \bmod n_{SRS}^{cs,max}$$

wherein $n_{SRS}^{cs,max}$ represents a maximum number of cyclic shifts, wherein $p_i$ indicates an antenna port identifier, wherein $N_{AP}$ indicates a number of the antenna ports, wherein $n_{SRS}^{eff}$ indicates an effective cyclic index, wherein $n_{SRS}^{cs,i}$ indicates a resulting parameter used to configure the cyclic shift for the antenna port i, wherein $n_{s,f}^\mu$ indicates a slot number of a radio frame, wherein l indicates an OFDM symbol index of the SRS transmission, wherein l' indicates an OFDM symbol index of the slot that corresponds to a first OFDM symbol of a SRS transmission in a slot given.

19. An apparatus for receiving a reference signal of a wireless communication system, wherein the apparatus for receiving is to receive a reference signal from another apparatus on a common set of resource elements (REs), the common set of resource elements being used by the other apparatus and one or more further apparatuses in the wireless communication system, so that the reference signal from the other apparatus and one or more further reference signals from the one or more further apparatuses use the same resource elements,
  wherein the apparatus for receiving is to differentiate the reference signals transmitted from a plurality of other apparatuses, which comprise the other apparatus, and the one or more further reference signals from the one or more further apparatuses by jointly analyzing a set of received symbols or by forwarding the set of received symbols to another apparatus for further processing,
  wherein the reference signal from the other apparatus depends on a base sequence and depends on a set of configuration parameters, or
  wherein the reference signal from the other apparatus depends on a sequence derived from the base sequence and depends on a set of configuration parameters.

20. An apparatus according to claim 19, wherein the set of configuration parameters are a set of cyclic shift parameters.

21. An apparatus according to claim 20, wherein the reference signal from the other apparatus and the one or more further reference signals from the one or more further apparatuses comprise a sequence of OFDM symbols,
  wherein the reference signal from the other apparatus and the one or more further reference signals from the one or more further apparatuses depend on different cyclic shift parameters.

22. An apparatus according to claim 19,
  wherein the apparatus for receiving is to apply the transmission sequence information to differentiate a plurality of antenna ports of the other apparatus and/or of the one or more further apparatuses, or
  wherein the apparatus for receiving is to report information related to one or more measurements performed on the reference signal to the other apparatus for further processing.

23. An apparatus according to claim 22,
  wherein the apparatus for receiving performs measurements and reports the measurements to another apparatus,
  wherein the report comprises at least one or more of the measurements:
    a set of ToA values
    a set of AoA values
    a set of AoD values
    a set of RSRP values
  wherein the report comprises at least one of the following complementary data:
    an identifier for the RS related to each measurement value,
    a timestamp of the measurement.

24. An apparatus according to claim 19,
  wherein the apparatus for receiving is to receive the set of cyclic shift parameters from a network node of the wireless communication system, or
  wherein, to receive said reference signal from said other apparatus, the apparatus for receiving is to find one or more peaks or one or more paths using a channel impulse response, and the apparatus for receiving is to map the one or more peaks or the one or more paths found to one or more peaks found in previously received symbols.

25. An apparatus according to claim 24,
  wherein the apparatus for receiving is to find the one or more peaks or the one or more paths using the channel impulse response in a current slot, and wherein the apparatus for receiving is to map the one or more peaks or the one or more paths found to one or more previously found peaks of one or more previous slots, or
  wherein the apparatus for receiving is to continuously update information for delay and amplitude for each peak to keep for the prediction of the next occurrence of a peak, or
  wherein the apparatus is to predict the positioning of the next occurrence of a peak using the information from previously received symbols, or
  wherein the apparatus is to store information on the one or more peaks or the one or more paths found in the current slot that provides information on at least one of an amplitude, a delay, a phase, a delay-drift, a phase-drift, peak appearance statistics or path appearance statistics, or
  wherein the apparatus is to map the one or more peaks or the one or more paths found in the current slot to one or more previously found peaks in one or more previous slot by calculating one or more expected delays for the current slot, and by mapping measured peaks to peaks stored in a memory of the apparatus.

26. An apparatus according to claim 25,
wherein, if one of the one or more founds peaks was found in the memory, the apparatus is to increase a peak appearance statistics or a path appearance statistics,
wherein, if one of the one or more founds peaks was not found in the memory, the apparatus is to add a new peak in the memory with initial value for peak appearance statistics or path appearance statistics.

27. An apparatus according to claim 26,
wherein, if a peak was not found in the current slot but exists in the memory, the apparatus is to reduce the peak appearance statistics or the path appearance statistics,
wherein the apparatus is to eliminate a no longer active peak from the memory, if the peak appearance statistics or the path appearance statistics becomes smaller than threshold.

28. A network node of a wireless communication system,
wherein the network node is to provide information on a set of configuration parameters to another apparatus of the wireless communication system, wherein the other apparatus is to transmit or receive a reference signal on a common set of resource elements (REs), the common set of resource elements being used by one or more further apparatuses in the wireless communication system, so that the reference signal of the other apparatus and one or more further reference signals of the one or more further apparatuses use the same resource elements, wherein the other apparatus is to transmit the reference signal depending on a base sequence and depending on the set of configuration parameters provided by the network node; or the other apparatus is to transmit the reference signal depending on a sequence derived from the base sequence and depending on the set of configuration parameters provided by the network node; or
wherein the network node is to receive a message from an apparatus comprising information on a reference signal transmitted from another apparatus on a common set of resource elements, the common set of resource elements being used by a plurality of antenna ports of the other apparatus and/or one or more further apparatuses in the wireless communication system, so that the reference signal from the other apparatus and one or more further reference signals from the one or more further apparatuses use the same resource elements, wherein the message comprises information relating to one or more additional paths found in the current slot which are associated with one or more previously found paths in one or more previous measurement, and wherein the network node is to apply transmission sequence information to differentiate the plurality of antenna ports of the other apparatus and/or one or more further apparatuses.

29. A network node according to claim 28,
wherein the set of configuration parameters are a set of cyclic shift parameters, or
wherein the network node is to receive the configuration parameters from another network node, or
wherein the network node is to provide the other apparatus with the configuration information comprising configuration information for the reference signal, and is to request the other apparatus to perform measurements.

30. A network node according to claim 29,
wherein the other network node implements a location management function or is a location management server.

31. A wireless communication system, comprising:
at least two apparatuses for a wireless communication system, wherein the apparatus is to transmit a reference signal on a common set of resource elements (REs), the common set of resource elements being used by one or more further apparatuses in the wireless communication system, so that the reference signal of the apparatus and one or more further reference signals of the one or more further apparatuses use the same resource elements,
wherein the apparatuses are to transmit the reference signal depending on a base sequence and depending on a set of configuration parameters, or the apparatuses are to transmit the reference signal depending on a sequence derived from the base sequence and depending on a set of configuration parameters, and
at least one apparatus for receiving a reference signal of a wireless communication system, wherein the apparatus for receiving is to receive a reference signal from another apparatus on a common set of resource elements (REs), the common set of resource elements being used by the other apparatus and one or more further apparatuses in the wireless communication system, so that the reference signal from the other apparatus and one or more further reference signals from the one or more further apparatuses use the same resource elements,
wherein the reference signal from the other apparatus depends on a base sequence and depends on a set of configuration parameters, or the reference signal from the other apparatus depends on a sequence derived from the base sequence and depends on a set of configuration parameters,
wherein the apparatus for receiving is to differentiate the reference signals transmitted from a plurality of other apparatuses, which comprises the other apparatus, and the one or more further reference signals from the one or more further apparatuses by jointly analyzing a set of received symbols or by forwarding the set of received symbols to another apparatus for further processing,
wherein the apparatus for receiving a reference signal of a wireless communication system is to receive a reference signal from at least one of the at least two apparatuses for a wireless communication system.

32. A method for a wireless communication system,
wherein the method comprises transmitting a reference signal by an apparatus on a common set of resource elements, the common set of resource elements being used by one or more further apparatuses in the wireless communication system, so that the reference signal of the apparatus and one or more further reference signals of the one or more further apparatuses use the same resource elements,
wherein the method comprises transmitting the reference signal depending on a base sequence and depending on a set of configuration parameters, or
wherein the method comprises transmitting the reference signal depending on a sequence derived from the base sequence and depending on a set of configuration parameters.

33. A non-transitory digital storage medium having a computer program stored thereon to perform the method according to claim 32 when said computer program is run by a computer.

34. A method for receiving a reference signal of a wireless communication system, wherein the method comprises receiving, by an apparatus for receiving, a reference signal from another apparatus on a common set of resource elements (REs), wherein the common set of resource elements are used by the other apparatus and one or more further apparatuses in the wireless communication system, so that the reference signal from the other apparatus and one or more further reference signals from the one or more further apparatuses use the same resource elements,
- wherein the reference signal from the other apparatus depends on a base sequence and depends on a set of configuration parameters, or the reference signal from the other apparatus depends on a sequence derived from the base sequence and depends on a set of configuration parameters,
- wherein the apparatus for receiving differentiates the reference signals transmitted from a plurality of other apparatuses, which comprises the other apparatus, and the one or more further reference signals from the one or more further apparatuses by jointly analyzing a set of received symbols or by forwarding the set of received symbols to another apparatus for further processing.

35. A non-transitory digital storage medium having a computer program stored thereon to perform the method according to claim 34 when said computer program is run by a computer.

36. A method for a wireless communication system,
- wherein a network node provides information on a set of configuration parameters to another apparatus of the wireless communication system, wherein the other apparatus transmits a reference signal on a common set of resource elements, wherein the common set of resource elements are used by one or more further apparatuses in the wireless communication system, so that the reference signal of the other apparatus and one or more further reference signals of the one or more further apparatuses use the same resource elements, wherein the other apparatus transmits the reference signal depending on a base sequence and depending on the set of configuration parameters provided by the network node, or the other apparatus transmits the reference signal depending on a sequence derived from the base sequence and depending on the set of configuration parameters provided by the network node, or
- wherein a network node receives a message from an apparatus comprising information on a reference signal transmitted from another apparatus on a common set of resource elements, the common set of resource elements being used by a plurality of antenna ports of the other apparatus and/or one or more further apparatuses in the wireless communication system, so that the reference signal from the other apparatus and one or more further reference signals from the one or more further apparatuses use the same resource elements, wherein the message comprises information relating to one or more additional paths found in the current slot which are associated with one or more previously found paths in one or more previous measurement, and wherein the network node applies transmission sequence information to differentiate the plurality of antenna ports of the other apparatus and/or one or more further apparatuses.

37. A non-transitory digital storage medium having a computer program stored thereon to perform the method according to claim 36 when said computer program is run by a computer.

* * * * *